(12) United States Patent
Ganesh et al.

(10) Patent No.: US 11,042,398 B2
(45) Date of Patent: Jun. 22, 2021

(54) SYSTEM AND METHOD FOR GUEST OPERATING SYSTEM USING CONTAINERS

(71) Applicant: Samsung Electronics Co., Ltd., Suwon-si (KR)

(72) Inventors: Guruprasad Ganesh, Santa Clara, CA (US); Sudhi Herle, Dallas, TX (US); Ahmed M. Azab, Palo Alto, CA (US); Rohan Bhutkar, San Jose, CA (US); Ivan Getta, Mountain View, CA (US); Xun Chen, Freemont, CA (US); Wenbo Shen, Sunnyvale, CA (US); Ruowen Wang, San Jose, CA (US); Haining Chen, Santa Clara, CA (US); Khaled Elwazeer, Santa Clara, CA (US); Mengmeng Li, San Jose, CA (US); Peng Ning, Saratoga, CA (US); Hyungseok Yu, Suwon-si (KR); Myungsu Cha, Suwon-si (KR); Kyungsun Lee, Suwon-si (KR); Se Young Choi, Hwaseong-si (KR); Yurak Choe, Suwon-si (KR); Yong Shin, Seongnam-si (KR); Kyoung-Joong Shin, Seoul (KR); Donguk Seo, Suwon-si (KR); Junyong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 16/504,075

(22) Filed: Jul. 5, 2019

(65) Prior Publication Data

US 2020/0012511 A1 Jan. 9, 2020

Related U.S. Application Data

(60) Provisional application No. 62/695,319, filed on Jul. 9, 2018, provisional application No. 62/695,339, filed
(Continued)

(51) Int. Cl.
*G06F 9/455* (2018.01)
*G06F 9/48* (2006.01)
(Continued)

(52) U.S. Cl.
CPC ...... *G06F 9/45558* (2013.01); *G06F 9/44526* (2013.01); *G06F 9/4812* (2013.01);
(Continued)

(58) Field of Classification Search
CPC .................................................. G06F 9/45558
See application file for complete search history.

(56) References Cited

U.S. PATENT DOCUMENTS 7,539,986 B2 5/2009 Grobman
8,589,952 B2 11/2013 Wong et al.
(Continued)

FOREIGN PATENT DOCUMENTS

CN 105808320 A 7/2016
CN 105844152 A 8/2016
(Continued)

OTHER PUBLICATIONS

Davi et al., "Privilege Escalation Attacks on Android", 13th International Conference on Information Security ( ISC 2010), Oct. 2010, 15 pages.
(Continued)

*Primary Examiner* — Charlie Sun

(57) ABSTRACT

A method for operating an electronic device, the method including spawning a name space tool (NST) as part of a
(Continued)

boot process of a host OS, wherein the NST is a process with a plurality of root privileges of the host OS. The method further includes spawning, by the NST, a container for a guest OS, wherein the container for the guest OS is mapped to a dedicated domain in the host OS, and dropping, by the NST, a root privilege of the host OS in response to spawning the container for the guest OS.

30 Claims, 15 Drawing Sheets

Related U.S. Application Data on Jul. 9, 2018, provisional application No. 62/697,885, filed on Jul. 13, 2018, provisional application No. 62/700,890, filed on Jul. 19, 2018, provisional application No. 62/713,983, filed on Aug. 2, 2018, provisional application No. 62/714,655, filed on Aug. 3, 2018.

(51) Int. Cl.
  *G06F 9/54* (2006.01)
  *G06F 9/445* (2018.01)

(52) U.S. Cl.
  CPC .... *G06F 9/542* (2013.01); *G06F 2009/45575* (2013.01); *G06F 2009/45583* (2013.01); *G06F 2009/45587* (2013.01); *G06F 2009/45591* (2013.01)

(56) References Cited

U.S. PATENT DOCUMENTS

| | | |
|---|---|---|
| 8,813,240 B1 | 8/2014 | Northup |
| 8,832,799 B2 | 9/2014 | Matsimanis et al. |
| 8,924,702 B2 | 12/2014 | Shen |
| 8,930,917 B2 | 1/2015 | Mittal et al. |
| 9,038,024 B2 | 5/2015 | Fippel |
| 9,075,818 B2 | 7/2015 | Cavage et al. |
| 9,268,670 B1 | 2/2016 | Lachwani et al. |
| 9,389,877 B2 | 7/2016 | Galicia et al. |
| 9,483,287 B2 | 11/2016 | Scheerer et al. |
| 9,665,525 B2 | 5/2017 | Soffer |
| 9,678,810 B2 | 6/2017 | Reeves et al. |
| 9,778,938 B2 | 10/2017 | Wilson |
| 9,954,958 B2 | 4/2018 | Childs et al. |
| 10,007,537 B2 | 6/2018 | Emelyanov et al. |
| 10,089,150 B2 | 10/2018 | Zhou |
| 10,162,684 B2 | 12/2018 | Feng et al. |
| 10,185,556 B2 | 1/2019 | Richstein et al. |
| 10,205,675 B2 | 2/2019 | Chen et al. |
| 2002/0083110 A1 | 6/2002 | Kozuch et al. |
| 2010/0060572 A1 | 3/2010 | Tsem |
| 2014/0115624 A1 | 4/2014 | Chen |
| 2014/0245294 A1 | 8/2014 | Kaul |
| 2015/0026680 A1 | 1/2015 | Farrell et al. |
| 2015/0138094 A1 | 5/2015 | Kim |
| 2015/0227449 A1 | 8/2015 | Kuang et al. |
| 2016/0098252 A1 | 4/2016 | Larsby et al. |
| 2018/0024817 A1 | 1/2018 | Iacov et al. |
| 2018/0025180 A1 | 1/2018 | Wang et al. |
| 2018/0136931 A1 | 5/2018 | Hendrich et al. |
| 2018/0137308 A1 | 5/2018 | Jung et al. |
| 2018/0157562 A1 | 6/2018 | Li et al. |
| 2018/0173885 A1 | 6/2018 | Ylonen |
| 2018/0293394 A1* | 10/2018 | Gunda ............... G06F 9/45558 |
| 2020/0036774 A1* | 1/2020 | Tada ...................... H04L 67/26 |

FOREIGN PATENT DOCUMENTS

| | | | |
|---|---|---|---|
| CN | 106708598 A | | 5/2017 |
| CN | 107463499 A | | 12/2017 |
| CN | 107643940 A | | 1/2018 |
| JP | 2014235579 A | | 12/2014 |
| KR | 10-2011-0111828 A | | 10/2011 |
| KR | 10-2013-0091184 A | | 8/2013 |
| KR | 10-1665666 B1 | | 10/2016 |
| KR | 10-1674515 B1 | | 11/2016 |
| KR | 10-2017-0078459 A | | 7/2017 |
| KR | 20180045347 A | | 5/2018 |
| WO | 9313482 A1 | | 7/1993 |

OTHER PUBLICATIONS

Yan et al., "SplitDroid: Isolated Execution of Sensitive Components for Mobile Applications", 11th EAI International Conference on Security and Privacy in Communication Systems, (SecureComm 2015), Oct. 2015, 18 pages.

"Isolate containers with a user namespace", Docker, Inc., 2018, 11 pages. https://docs.docker.com/engine/security/userns-remap/.

"Unprivileged containers in Go, Part3: Mount namespace", LK4D4 Blog, Jul. 23, 2015, 6 pages. https://lk4d4.darth.io/posts/unpriv3/.

* cited by examiner

1305 — SPAWN A NAME SPACE TOOL (NST) AS PART OF A BOOT PROCESS OF A HOST OS, WHEREIN THE NST IS A PROCESS WITH A PLURALITY OF ROOT PRIVILEGES OF THE HOST OS

1310 — SPAWN, BY THE NST, A CONTAINER FOR A GUEST OS, WHEREIN THE CONTAINER FOR THE GUEST OS IS MAPPED TO A DEDICATED DOMAIN IN THE HOST OS

1315 — DROP, BY THE NST, A ROOT PRIVILEGE OF THE HOST OS IN RESPONSE TO SPAWNING THE CONTAINER FOR THE GUEST OS

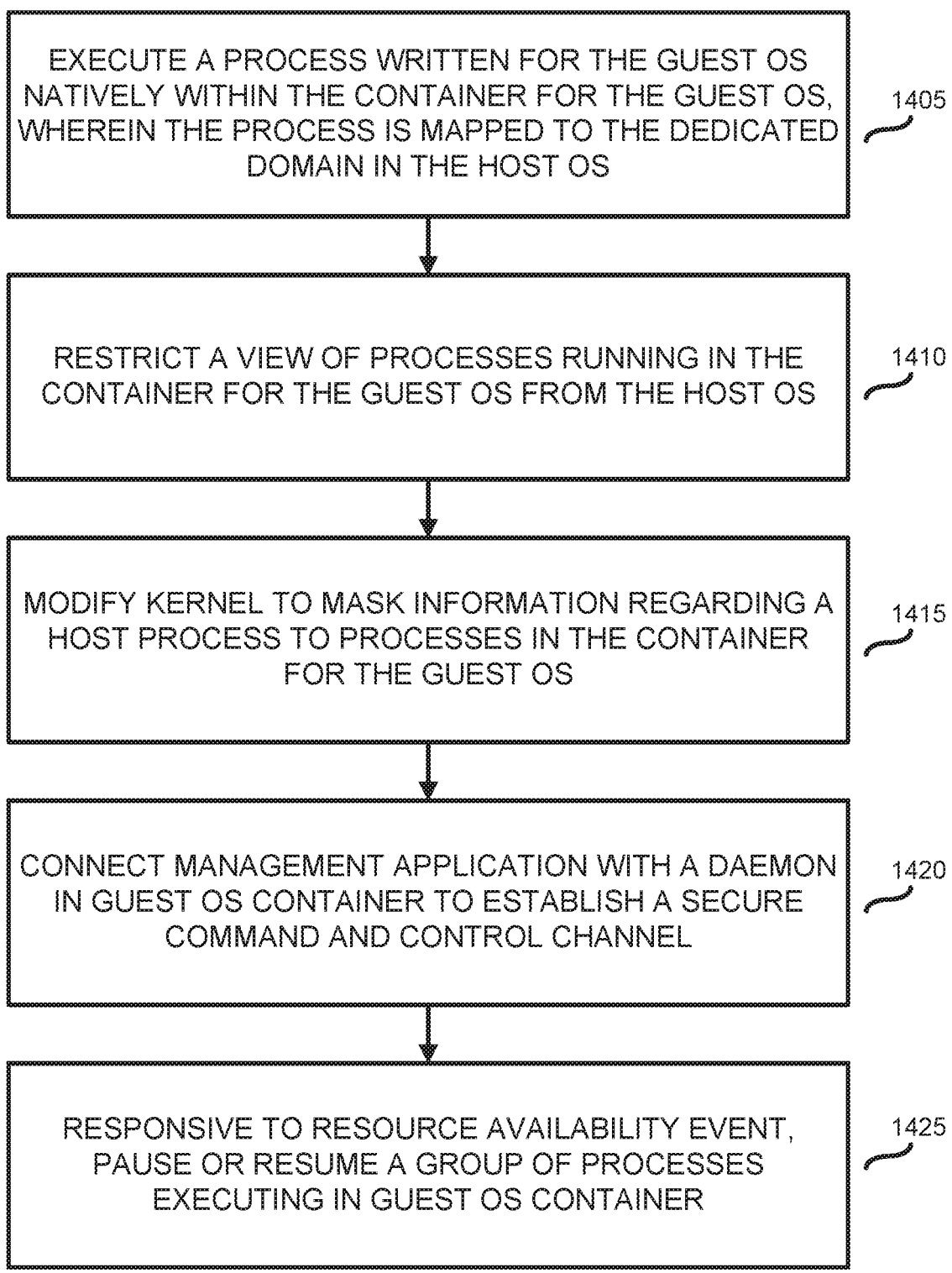

SYSTEM AND METHOD FOR GUEST OPERATING SYSTEM USING CONTAINERS

CROSS-REFERENCE TO RELATED APPLICATION AND CLAIM OF PRIORITY

This application claims priority under 35 U.S.C. § 119(e) to U.S. Provisional Patent Application No. 62/695,319 filed on Jul. 9, 2018, U.S. Provisional Patent Application No. 62/695,339 filed on Jul. 9, 2018, U.S. Provisional Patent Application No. 62/697,885 filed on Jul. 13, 2018, U.S. Provisional Patent Application No. 62/700,890 filed Jul. 19, 2018, U.S. Provisional Patent Application No. 62/713,983 filed Aug. 2, 2018, and U.S. Provisional Patent Application No. 62/714,655 filed Aug. 3, 2018. The above-identified provisional patent applications are hereby incorporated by reference in its entirety.

TECHNICAL FIELD

This disclosure relates generally to implementing a guest environment on a computing platform. More specifically, this disclosure relates to a system and method for a guest operating system using containers.

BACKGROUND

Improvements in the processing and battery capabilities of certain mobile electronic devices (for example, smartphones and tablets), as well as macro-level changes in use habits among users have increased the interest in using such mobile electronic devices as platforms for computing tasks, such as developing and debugging software applications, traditionally performed in whole or in part on more static platforms, such as desktop or laptop computers. This erosion of the distinction between the universe of applications and computing tasks to be performed on desktop and laptop computers, and the universe of applications and tasks which can be carried out on certain mobile computing platforms, such as tablets and smartphones, presents a wealth of technical challenges and opportunities in the functionality of certain mobile computing platforms. Examples of the above-referenced technical challenges and opportunities for enhancement include the issue of how to implement a second, or guest operating system (OS), such as an operating system traditionally associated with a more static computing platform, on a mobile computing platform.

SUMMARY

This disclosure provides a system and method for implementing a guest operating system using containers.

In a first embodiment, a method for operating an electronic device, the method including spawning a name space tool (NST) as part of a boot process of a host OS, wherein the NST is a process with a plurality of root privileges of the host OS. The method further includes spawning, by the NST, a container for a guest OS, wherein the container for the guest OS is mapped to a dedicated domain in the host OS, and dropping, by the NST, a root privilege of the host OS in response to spawning the container for the guest OS.

In a second embodiment, an apparatus includes a processor and a memory comprising a host OS. The memory contains instructions, which, when executed by the processor, cause the apparatus to spawn a name space tool (NST) as part of a boot process of the host OS, wherein the NST is a process with a plurality of root privileges of the host OS, spawn, by the NST, a container for a guest OS, wherein the container for the guest OS is mapped to a dedicated domain in the host OS, and spawn, by the NST, a root privilege of the host OS in response to spawning the container for the guest OS.

In a third embodiment, a non-transitory, computer readable medium, includes program code, which, when executed by a processor, causes an apparatus to spawn a name space tool (NST) as part of a boot process of a host OS, wherein the NST is a process with a plurality of root privileges of the host OS, spawn, by the NST, a container for a guest OS, wherein the container for the guest OS is mapped to a dedicated domain in the host OS, and spawn, by the NST, a root privilege of the host OS in response to spawning the container for the guest OS.

In a fourth embodiment, an apparatus includes a processor and a memory, containing a host OS. The memory contains instructions, which, when executed by the processor, cause the apparatus to provide, in a guest OS container running on the apparatus, a development environment for an application running on the host OS of the apparatus. The development environment is configured to pass commands between a tool service of the development environment, and a daemon running on the host OS via a secure communication channel configured between the tool service and the daemon running on the host OS.

In a fifth embodiment, an apparatus includes a processor and a memory containing a host OS. The memory contains instructions, which, when executed by the processor, cause the apparatus to provide a development environment for a target application running on the host OS of the apparatus. A framework of the host OS comprises an activity plugin, the activity plugin configured to control an activity status of the target application to permit the target application to continue running without restriction when the development environment is operating in a foreground of a userspace provided by the host OS.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 13 illustrates operations of an example of a method for implementing a guest OS using containers, according to various embodiments of this disclosure; and FIGS. 14A and 14B illustrate operations of methods for implementing a guest OS using containers and for performing various development operations, according to certain embodiments of this disclosure.

DETAILED DESCRIPTION

FIGS. 1 through 14B, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged computing system.

Figure 1:
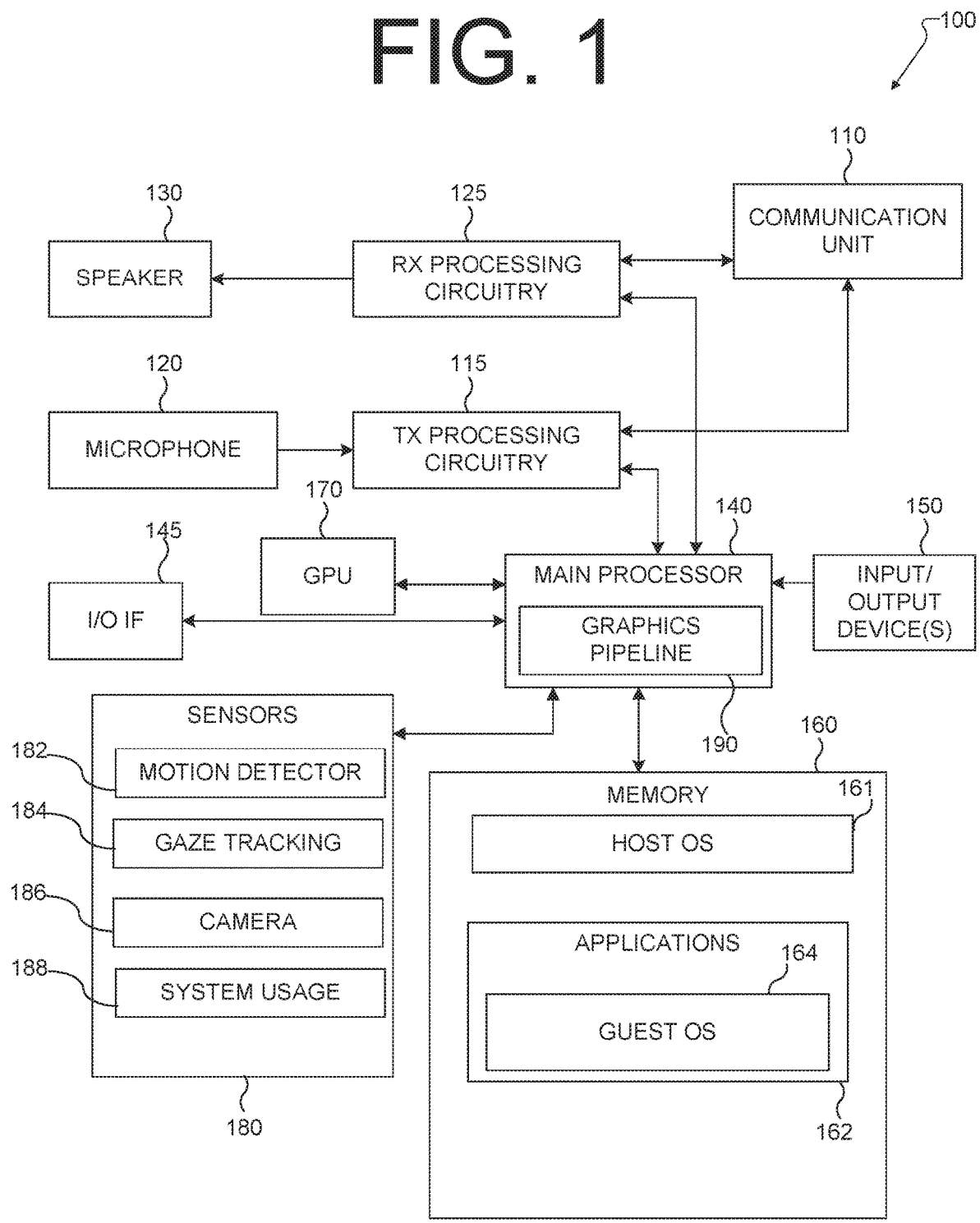
FIG. 1 illustrates an example of an electronic device for providing a guest operating system using a container according to various embodiments of this disclosure.

FIG. 1 illustrates an example of a device for simultaneously running a host operating system (OS) and a guest OS using containers according to certain embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in FIG. 1, the device 100 includes a communication unit 110 that may include, for example, a radio frequency (RF) transceiver, a BLUETOOTH® transceiver, or a WI-FI® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes a plurality of operating system (OS) programs 161 and one or more applications 162. According to certain embodiments, host OS program 161 comprises a host, or default operating system. Further, according to certain embodiments of this disclosure, memory 160 comprises one or more guest operating systems 164, which as described herein, can be implemented on one or more containers provided by device 100.

Applications 162 can include legacy applications, or applications developed for, and having application logic tied to host or guest operating system programs on device 100.

The communication unit 110 may receive an incoming RF signal such as a BLUETOOTH or WI-FI signal. The communication unit 110 may down-convert the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, and/or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the host OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the host OS program 161 or in response to inputs from a user, sensors 180 or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device. Input/output device(s) 150 are, according to certain embodiments, associated with one or more of sensor(s) 180 to provide input to main processor 140.

Input/output device(s) 150 can include one or more screens, which can be a liquid crystal display, light-emitting diode (LED) display, an optical LED (OLED), an active matrix OLED (AMOLED), or other screens capable of rendering graphics. The one or more screens can include a plurality of display elements, such as electronically modulated light emitting diodes, that define a physical, or native resolution of a screen comprising input/output device(s) 150. For example, a WQHD display can have a physical resolution of 2560×1440 pixels. Additionally, screens can include a touchscreen capable of registering tactile inputs correlating with pixels of the screen and/or regions of the screen.

The main processor 140 can be configured to implement a graphics pipeline 190, including performing rendering and compositing operations according to control logic provided by host operating system 161, applications 162 and/or other executable program code stored in memory 160.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170, and sensors 180. Main processor 140 can offload processing tasks associated with implementing graphics pipeline 190 to GPU 170. Such graphics processing tasks can include, without limitation, shading, primitive assembly and/or rasterization.

Sensors 180 can comprise a variety of sensors for generating inputs processed by device 100, and include without limitation, accelerometers, digital cameras, touch sensors, digital thermometers, pressure sensors and global positioning system sensors. For example, sensors 180 can include a motion detector 182. Motion detector 182 can be an optical sensor, an accelerometer or a gyroscopic sensor. Additionally, motion detector 182 can comprise multiple motion detectors, such as motion detectors coupled to a user's head and/or limbs. Additionally, sensors 184 may include cameras and other sensors 184 suitable for performing gaze tracking of a user's eyes, to detect which portions of the screen a user's gaze is focused upon. Sensors 180 can include additional cameras 186, including cameras disposed on the back side of screen, including sensors for providing an augmented reality (AR) experience, in which digital images are superimposed over the view of a camera positioned on or near a user's eye. Further, sensors 180 can include sensors 188 configured to monitor the usage of system resources, including, without limitation, main processor 140, GPU 170 and/or memory 160.

Although FIG. 1 illustrates one example of a device 100 for simultaneously running a host OS and a guest OS using containers, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
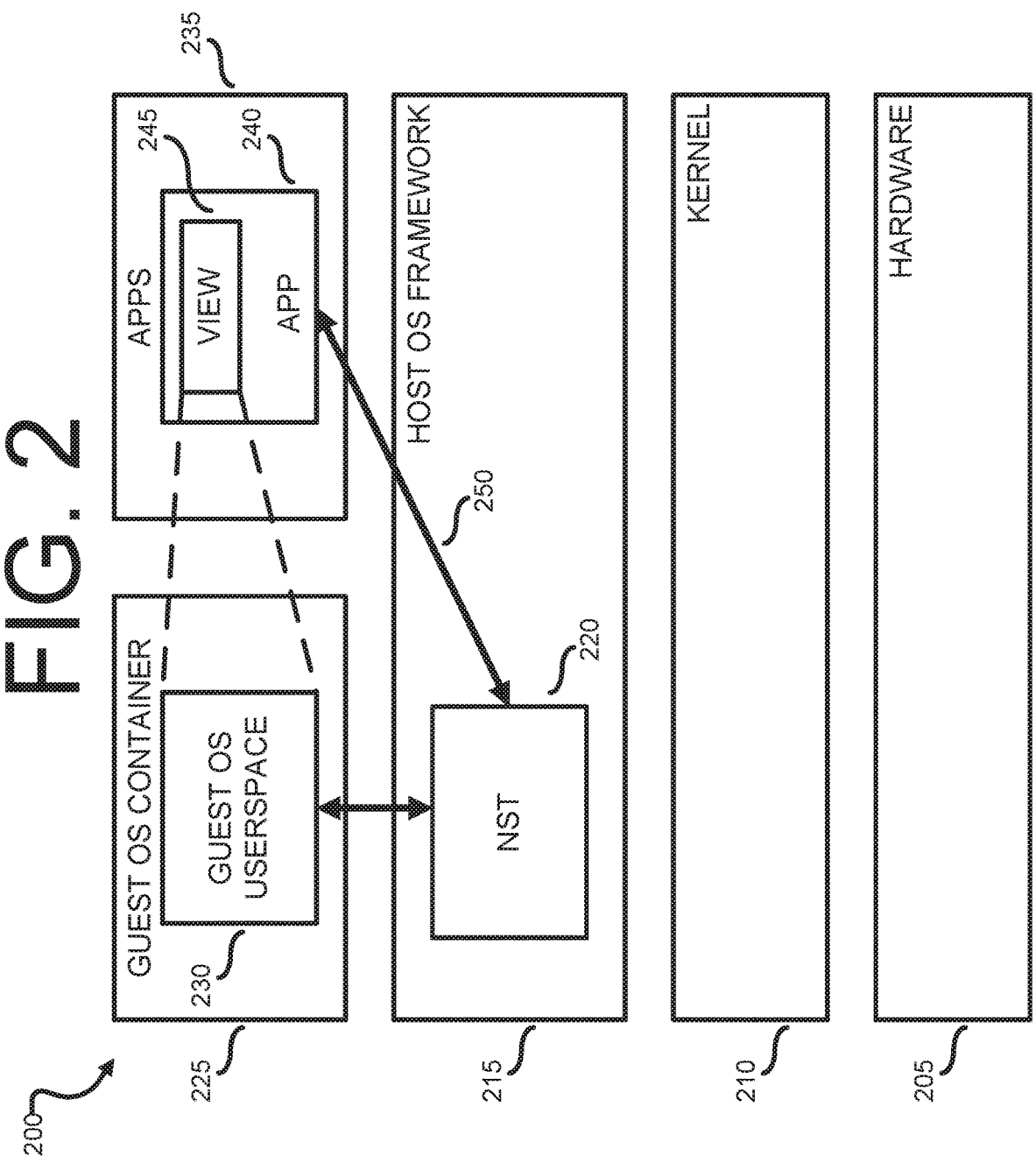
FIG. 2 illustrates an example of an architecture for providing a guest operating system using a container, according to some embodiments of this disclosure.

FIG. 2 illustrates an example of an architecture 200 for providing a guest operating system using a container, according to some embodiments of this disclosure. The embodiment of the architecture 200 shown in FIG. 2 is for illustration only. Other embodiments could be used without departing from the scope of the present disclosure.

As noted herein, the erosion of traditional functional distinctions between certain mobile electronic devices, such as smartphones and tablets, and desktop and laptop computers presents a wide range of technical challenges and opportunities for improving the functionality of certain mobile devices. Running applications developed for typically desktop or laptop-oriented operating systems (such as Windows, IOS or LINUX) on mobile devices presents one such source of challenges and opportunities for improvements in the functionality of certain mobile devices.

The challenges associated with implementing a guest operating system (OS) on a mobile device associated with a host OS include maintaining the security features and integrity of the host OS, while at the same time, enabling a guest OS to run on the mobile device. For example, a second OS can be provisioned on a mobile device by "jailbreaking" or "rooting" the device, such that processes beyond those originally intended by the OS are provisioned with a fuller set of permissions (sometimes referred to as "root" permissions).

However, "rooting" compromises the device's security, which is, in part, premised on a predefined, limited set of processes having "root" permissions. Further, the host OS of other mobile devices are, in certain cases, configured to not exchange data or interact with devices which have been "jailbroken" or otherwise deviated from predefined rooting policies. As a further example of the challenges associated with implementing a guest OS on a mobile device, in some cases, an instance of a second OS can be implemented on a mobile device by running a virtual machine (VM). However, in many cases, virtualization imposes unacceptable power and processing demands and provides unsatisfactory operating speeds. Thus, the technical challenges associated with implementing a guest OS on a mobile device associated with a host OS include, at a minimum, ensuring device security and, where applicable, maintaining adherence to rooting policies, as well as conserving power and processing resources, which is often a global concern across battery powered mobile devices.

Referring to the non-limiting example of FIG. 2, an example of an architecture 200 for implementing a guest OS on a mobile device using a container is shown. According to certain embodiments, the architecture of a mobile device (for example, device 100 in FIGURE) can be modeled as a stack of abstraction layers connecting applications and higher-level processes of the mobile device to the device hardware.

According to certain embodiments, architecture 200 comprises hardware layer 205, which includes components of the mobile device which are controlled by processes executed by a processor (for example, main processor 140 in FIG. 1) of the mobile device. In some embodiments, hardware layer 205 includes, without limitation, input/output devices (for example, input/output devices 150 in FIG. 1) such as touchscreens and fingerprint scanners, cameras (for example, camera 186 in FIG. 1), baseband modems or other communication hardware (for example, communication unit 110 in FIG. 1), and the computer's memory (for example, memory 160 in FIG. 1).

As shown in the non-limiting example of FIG. 2, architecture 200 includes kernel 210. According to various embodiments kernel 210 comprises a component (or plurality of components) of a host OS which operates an intermediary between hardware layer 205 and software (for example, applications 162 in FIG. 1) operating on the mobile device. According to certain embodiments, kernel 210 issues system calls to control hardware of the mobile device, as well as managing boot processes of the mobile device.

According to various embodiments, architecture 200 further comprises a host OS framework 215, which comprises, inter alia, a suite of application programming interfaces for building applications, as well as services for initiating and managing interactions between applications and the kernel layer 210. As shown in the non-limiting example of FIG. 2, host OS framework 215 comprises one or more name space tools (NST) 220.

According to various embodiments, NST 220 comprises a service within host OS framework 215, which provides a secure API within the host OS for configuring, creating and destroying containers (for example, guest OS container 225) which provide userspaces for instances of a guest OS. According to some embodiments, NST 220 has root, or "super user" privileges for controlling the lifecycle of the container (for example, guest OS container 225) providing the instance of the guest OS.

Additionally, and as discussed in greater detail herein, NST 220 handles aspects of mapping namespaces associated with processes in the guest OS to namespaces in the host OS. In this way, by managing namespace mappings between a guest OS environment and a host OS environment, NST 220 restricts the visibility of processes in the host OS environment to the guest OS environment, and likewise restricts the visibility of processes in guest OS environment to processes in the host OS. In certain embodiments according to this disclosure, by restricting the visibility of processes between the host OS and guest OS environments, the NST logically isolates the two OS environments from one another, thereby enhancing the security of system. For example, the above-described logical isolation provides a defense against malicious code running in a guest OS environment accessing certain resources (for example, application data of applications operating in the host OS) of the host OS environment.

Referring to the non-limiting example of FIG. 2, architecture 200 further comprises one or more guest OS containers 225. According to various embodiments, guest OS container 225 comprises a secure sandbox which utilizes namespace containers of kernel 210. As shown in this illustrative example, guest OS container provides an operating environment in which a guest OS (for example, UBUNTU as a guest OS in a mobile device for which ANDROID or IOS is the host OS) shares an underlying kernel (for example, kernel layer 210) with the host OS. According to various embodiments, by allowing instance(s) of a guest OS to operate in guest OS container 225 and share kernel 210 with the host OS, the computational load and resource utilization associated with running two operating systems on a single device is substantially reduced, as compared to providing a guest OS operating environment through other techniques, such as virtualization or device emulation. Thus, certain embodiments according to this disclosure address the technical challenges of breaking down the divisions between tasks for mobile computing platforms (such as smartphones and tablets) and tasks for less power-constrained computing platforms (for example, desktop and laptop computers), in a way that is mindful of the power management concerns associated with small, battery powered devices.

In some embodiments, NST 220 configures guest OS container 225 to provide a guest OS userspace 230 in which all of the processes of the guest OS are in a separate and different namespace compared to the processes of the host OS. In this way, guest OS userspace 230 is logically isolated from the processes of the host OS, thereby a mechanism for implementing a separate OS which does not present the security problems associated with "rooting" or "jailbreaking" the device. According to various embodiments, processes of guest OS userspace 230 have virtual privileged access to resources (for example, files and other data) within guest OS container 225, but do not have the ability to access resources managed by the host OS. Further, according to some embodiments, guest OS container 225 is spawned such that there is file system and runtime isolation between processes operating inside guest OS container 225 and processes operating outside of guest OS container 225.

In certain embodiments according to this disclosure, the visibility of processes operating in guest OS container 225 in the host OS can be restricted by using the mount namespace of the host OS. For example, in certain host OS, an unshare call can be used to remove container mount information for guest OS container 225 from a mount table of the host OS. According to various embodiments, removing the container mount information for the guest OS container protects the host OS, in that all NOSUID information associated with processes in guest OS container 225 is hidden from the host OS, which acts as a safeguard against unwanted privilege escalation by processes operating in guest OS container 225. According to certain embodiments, by removing the container mount information for guest OS container 225 also protects data within the container, as removal of the container mount information from the host OS mount table prevents the host OS (and host OS applications) from reading or writing any files within guest OS container 225. According to various embodiments, the view of processes operating in the host OS within guest OS container 225 can be also be restricted. For example, in some embodiments, a pivot_root call can be used to remove the host mount information from the mount table of guest OS container 225.

According to certain embodiments, architecture 200 comprises one or more host OS applications 235, which comprise applications running on the host OS. Referring to the non-limiting example of FIG. 2, applications 235 comprise at least one application 240 which is configured to provide a mechanism through which users can interact with guest OS userspace 230, as if guest OS userspace 230 were one of host OS applications 235. According to some embodiments, application 240 utilizes provides a mechanism for viewing the screen output of applications running in guest OS userspace 230. In some embodiments, the mechanism comprises the use of one or more protocols similar to virtual network computing ("VNC") protocols to provide a view 245 of applications in guest OS userspace 230.

As shown in the illustrative example of FIG. 2, architecture 200 comprises a secure communication channel 250 between application 240 and NST 220, which enables application 240 to utilize APIs provides by NST 220 to control the guest OS running inside of guest OS container 225. According to various embodiments, secure communication channel 250 is secured by internal security mechanisms of the host OS (for example, in embodiments where the host OS is LINUX, secure communication channel 250 may be secured through a predetermined combination of security-enhanced LINUX (SELinux) modes and SELinux processes).

Figure 3:
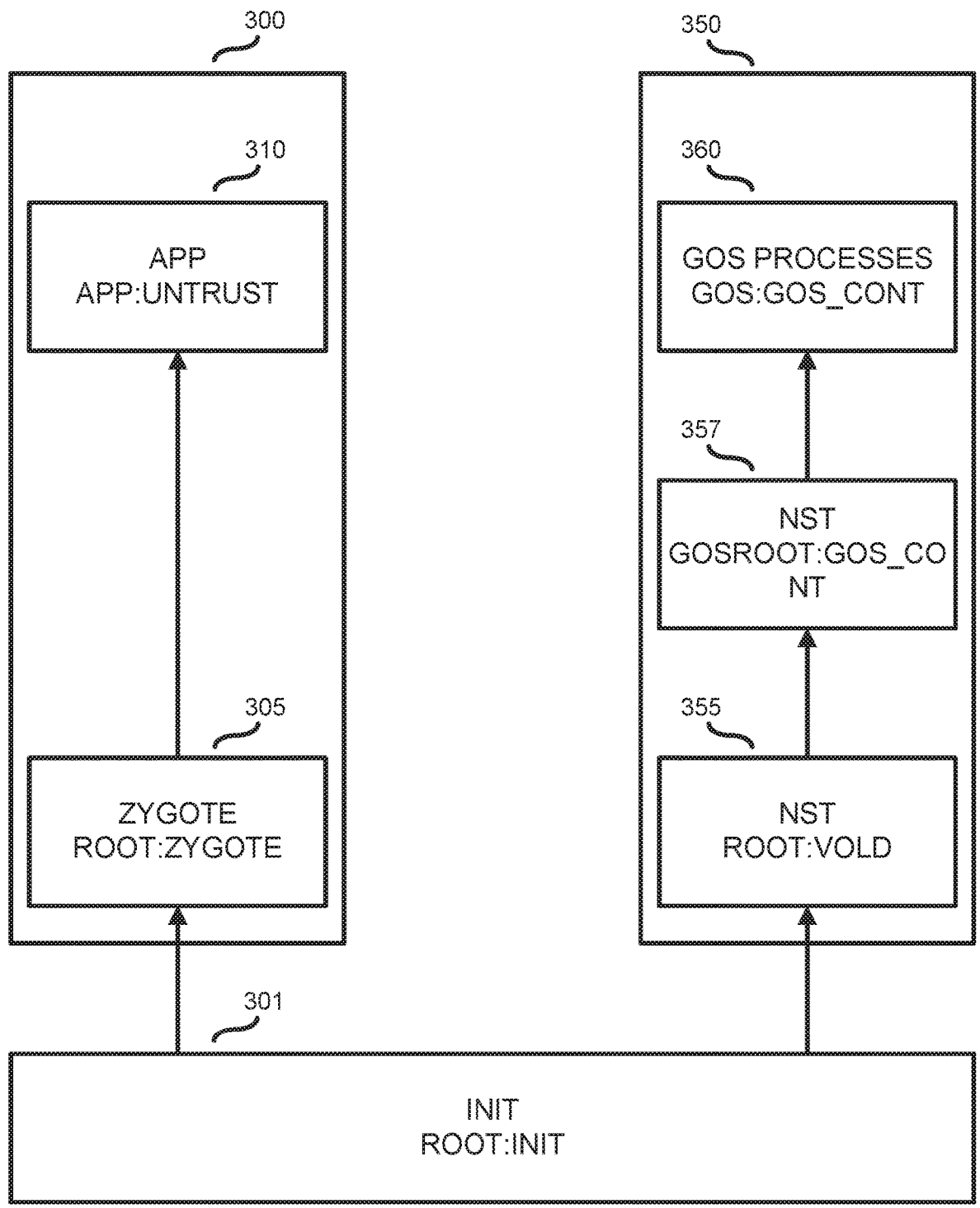
FIG. 3 illustrates aspects of spawning a container for a guest operating system, according to certain embodiments of this disclosure.

FIG. 3 illustrates aspects of spawning a container for a guest operating system, according to certain embodiments of this disclosure. The embodiment for spawning a container shown in FIG. 3 is for illustration only. Other embodiments could be used without departing from the scope of the present disclosure.

As noted elsewhere in this disclosure, certain embodiments according to this disclosure address the technical challenges associated with implementing multiple operating systems on a single device in a way that does not compromise the security structures of the host OS (such as can occur when a device is "rooted" or "jailbroken"), but instead, maintains or enhances the security structures of the host OS. According to certain embodiments, the security of a device simultaneously running a host OS and a guest OS can be enhanced by, without limitation, logically isolating processes operating in a guest OS container (for example, guest OS container 225 in FIG. 2) from the host OS and by managing the privileges of the spawning processes once the guest OS container has been created.

Referring to the non-limiting example of FIG. 2, the transitions associated with spawning a process within domains 300 associated with a host OS of a device are shown on the left side of the figure, and the transitions associated with spawning a process in domains 350 associated with a guest OS. According to certain embodiments, the security structures of the host OS require that the privileges to make calls to the device through the kernel (for example, kernel 210) adhere to predefined inheritance and spawning requirements. For example, in a device running a version of the host OS which has not been "rooted," "jailbroken" or similarly modified, attempts to arbitrarily provision a process running with "root" or superuser capabilities outside of the spawning and inheritance requirements of the host OS typically fail.

According to certain embodiments, the boot process of a host OS includes an init process 301, which initializes elements of the host OS. As shown in the illustrative example of FIG. 3, init process 301 is associated with the domain "root:init," which has a full set of permissions over processes and resources of the device.

According to various embodiments, as part of launching an application within the set of domains 300 associated with the host OS of the device, the host OS spawns "zygote" process 305, which acts as a template process for applications and services operating within domains 300 associated with the host OS. As shown in FIG. 3, "zygote" process 305 is associated with the domain "root:zygote," and as such, inherits the root-level permissions over processes of the device from init process 301. According to some embodiments, zygote process 305 spawns application 310.

As shown in the illustrative example of FIG. 3, application 310 is a process or service running in the domains 300 associated with the host OS, and is associated with the domain "app:untrust." According to certain embodiments, the domain "app:untrust" is an untrusted application which inherits a subset of the permissions provided to zygote process 305.

In this illustrative example, the transitions between domains within the set of domains 300 associated with the host OS of the device and provisioning of permissions to processes operating within domains 300 is deterministic and verifiable, and as such, complies with security structures of the host OS. According to various embodiments, processes asserting high-level permissions (for example, root level permissions) in the absence of a chain of transitions between domains are denied high level access.

According to various embodiments, processes operating in guest OS containers (for example, guest OS container 225 in FIG. 2) transition between domains and provision processes operating within a guest OS with permissions in a way that complies with the security structures of the host OS.

Referring to the non-limiting example of FIG. 3, as part of establishing a guest OS container, the host OS spawns NST process 355, which, according various embodiments, is a name space tool (for example, name space tool 220 in FIG. 2) for creating and managing the lifecycles of guest OS containers. As shown in the illustrative example of FIG. 3, NST process 355 is associated with the domain "root:vold," which occupies a separate namespace to processes operating under the host OS. Further, as shown in FIG. 3 NST process 355 inherits the root-level permissions over processes from init process 301.

According to various embodiments, NST process 355 spawns NST process 357. As shown in the non-limiting example of FIG. 3, NST process 357 comprises a guest OS container (for example, guest OS container 225 in FIG. 2) in which an instance of the guest OS can run, and provide a guest OS userspace (for example, guest OS userspace 230 in FIG. 2). According to various embodiments, NST process 357 is associated with the domain "GOSRoot: GOS_Cont," indicating that, subsequent to establishing the container, the NST drops the privileges and permissions of the "root" domain, and instead has a privilege set comprising a defined subset of the privileges and permissions of the root domain to access resources outside of the guest OS container. According to certain embodiments, the retained privileges (also referred to as CAPS) of NST process 357 to access resources outside of a guest OS container comprise the setuid, setgid, chown, fowner, dac override and kill system calls. According to various embodiments, NST process 357 retains root privileges to access and manage resources within the guest OS container.

In various embodiments according to this disclosure, guest OS processes 360 are spawned within the guest OS container established by NST process 355. As shown in this illustrative example, all of the processes within the guest OS container run in the common domain "GOS:GOS_Cont," and are thus isolated from the host OS and indistinguishable to processes operating outside of the guest OS container. In various embodiments according to this disclosure, the user ID, group ID and process ID mapping of processes operating in a container are mapped to a common base prefix in a user ID namespace. For example, within the guest OS, a process may be identified as "UID: 107, PID: 131, /usr/bin/dbus-daemon—system." However, the processes of the guest OS container may be mapped to a common container root value, such that much of the identifying information of the process is not visible in the host OS. For example, the above-described process may only be mapped to the following namespace information in the host OS "UID: 1638400107 dbus-daemon."

According to various embodiments, details of the mapping structures of the host OS or the guest OS can facilitate restricting the visibility of processes of a guest OS container to the host OS. Referring to the illustrative example of the previous paragraph, the host OS "UID:1638400107" is one of a plurality user IDs from inside a guest OS container which has the number 1638400000 as a base. In certain embodiments, the number 1638400000 is particularly effective as a base for UIDs of processes inside the container, as certain OS provide for a total of 65336 possible UIDs, and 1638400000 is a multiple of 65336 which allows certain digits of the UID visible in the container to have the same value inside the container and outside the container. In this way, only a desired portion of the information identifying processes in the guest OS container is invisible to processes of the host OS.

Figure 4:
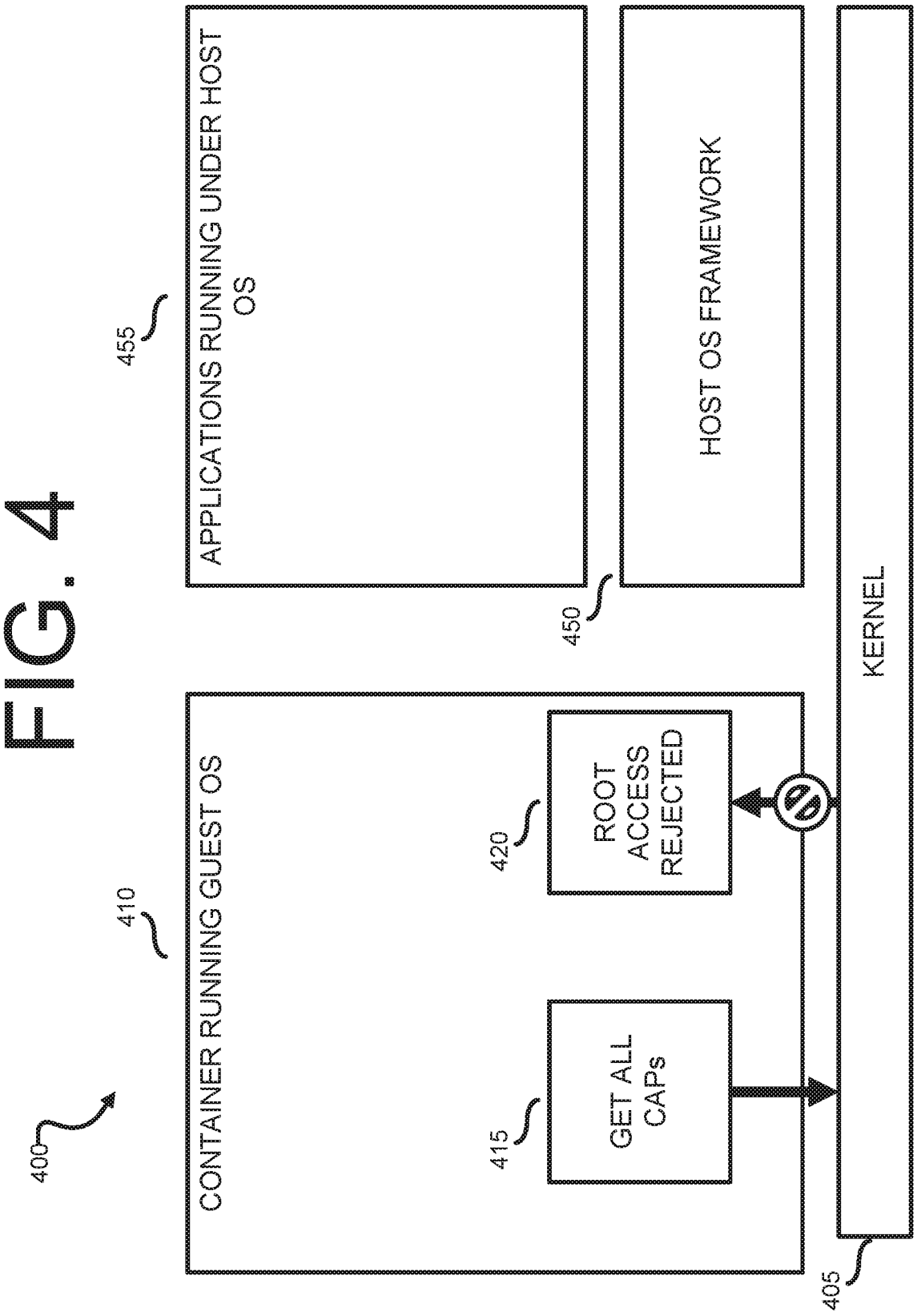
FIG. 4 illustrates aspects of CAP kernel reinforcement according to various embodiments of this disclosure.

FIG. 4 illustrates aspects of CAP kernel reinforcement according to various embodiments of this disclosure. The embodiment for CAP kernel reinforcement shown in FIG. 4 is for illustration only. Other embodiments could be used without departing from the scope of the present disclosure.

As noted elsewhere, the technical challenges and opportunities for improvement associated with operating certain mobile devices, such as certain smartphones and tablets as hybrid computing platforms simultaneously running a host OS and a guest OS include device security, and, in particular, establishing safeguards to prevent processes of a guest OS from operating as vectors for attacks on the resources of the host OS. As discussed herein, according to certain embodiments, the security of the resources of the host OS can be enhanced by an NST dropping the bulk of its root privileges to resources or APIs of the host OS once a guest OS container is launched.

According to certain embodiments, the security of the host OS against attacks launched from a guest OS container (for example, guest OS container 225 in FIG. 2) can be further enhanced through CAP kernel reinforcement. As used in this disclosure, "CAP kernel reinforcement" encompasses leveraging security mechanisms of the host OS to defeat certain attempts at privilege escalation (for example, a process within a guest OS container attempting to "claw back" some or all of the root privileges of NST process 355 in FIG. 3) from the container.

Referring to the non-limiting example of FIG. 4, an example of aspects of an architecture 400 of a device (for example, device 100 in FIG. 1) simultaneously running a host OS and a guest OS according to certain embodiments of this disclosure is shown.

As shown in the non-limiting example of FIG. 4, architecture 400 comprises kernel 405, which is the kernel (for example, kernel layer 210) of the host OS of the device. According to certain embodiments, kernel 405 is shared by a guest OS container 410, as well as host OS framework 450, through which host OS applications 455 interact with kernel 405. In this way, the efficiency and performance of the device overall is enhanced relative to systems provisioning a guest OS through virtualization and emulation, in that a virtual machine ("VM") does not have to unnecessarily perform the computational tasks associated with providing the kernel-level functionalities of the guest OS.

According to certain embodiments, architecture 400 further comprises one or more guest OS containers 410, which have been provisioned with a limited subset of capabilities, or privileges to make system calls to kernel 405 to access resources of the host OS. For example, guest OS container 410 may be provisioned with only the following six capabilities ("CAPs") to make system calls to kernel 405: setuid, setgid, chown, fowner, dac_override and kill.

To the extent that it may be possible for malicious code in guest OS container 410 to escalate its privileges and assert CAPs beyond those provisioned to guest OS container 410, according to certain embodiments, kernel 405 is configured to reinforce the limits on the CAPs of processes in guest OS container 410 to make system calls to access resources of the host OS. For example, in certain embodiments, kernel 405 is configured to filter certain system calls (for example, system calls involving CAPs outside of the permissions of guest OS container 410). According to certain embodiments, this filtering may be implemented through a whitelist, or checking the path of a system call (for example, by determining whether it is associated with an identifier, such as a UID, of the namespace of the guest OS container) to distinguish between processes of the host OS and the guest OS.

As shown in the illustrative example of FIG. 4, when a process 415 running in guest OS container 410 maliciously attempts to make a system call involving a CAP outside of the restricted subset of CAPs permissioned to guest OS container 410, by implementing CAP kernel reinforcement by configuring kernel 405 to filter system calls, the attempt at sudo-enabled, or root level access to host OS resources by process 415 is rejected, as shown by box 420.

According to certain embodiments, a logical partition between processes in guest OS container 410 and host OS processes can be created or reinforced by modifying or configuring kernel 405 to return different information regarding host OS and guest OS container processes. Specifically, according to certain embodiments, information from which the identity of processes running in a host OS, or within guest OS container 410 can be inferred across the logical partition between the "worlds" of the host OS and guest OS container is made less visible across the logical partition. In this way, devices implementing both a host OS and a guest OS can reduce the risk of side channel attacks of the host OS space from guest OS container 410 and vice versa.

In certain embodiments, such as, for example, embodiments in which the host OS uses a LINUX-based kernel, files in the/proc, /sys and/dev file systems contain information which can potentially be used for side-channel attacks across a logical partition between processes of a guest OS and the host OS. As one non-limiting example, information in a /proc/stat file can be used by processes in guest OS container to infer keyboard inputs to the host. According to certain embodiments, kernel 405 can be modified to such that sensitive information (for example, certain information in a/proc file which can be used in a side-channel attack) is masked from a user space across the host OS-guest OS partition. In certain embodiments, the sensitive information is zeroed out. In some embodiments, noise (for example, random numbers) is added to the sensitive information, such that it becomes unrecognizable, and making the inferences used to support side-channel attacks becomes increasingly difficult, if not impossible.

Figure 5:
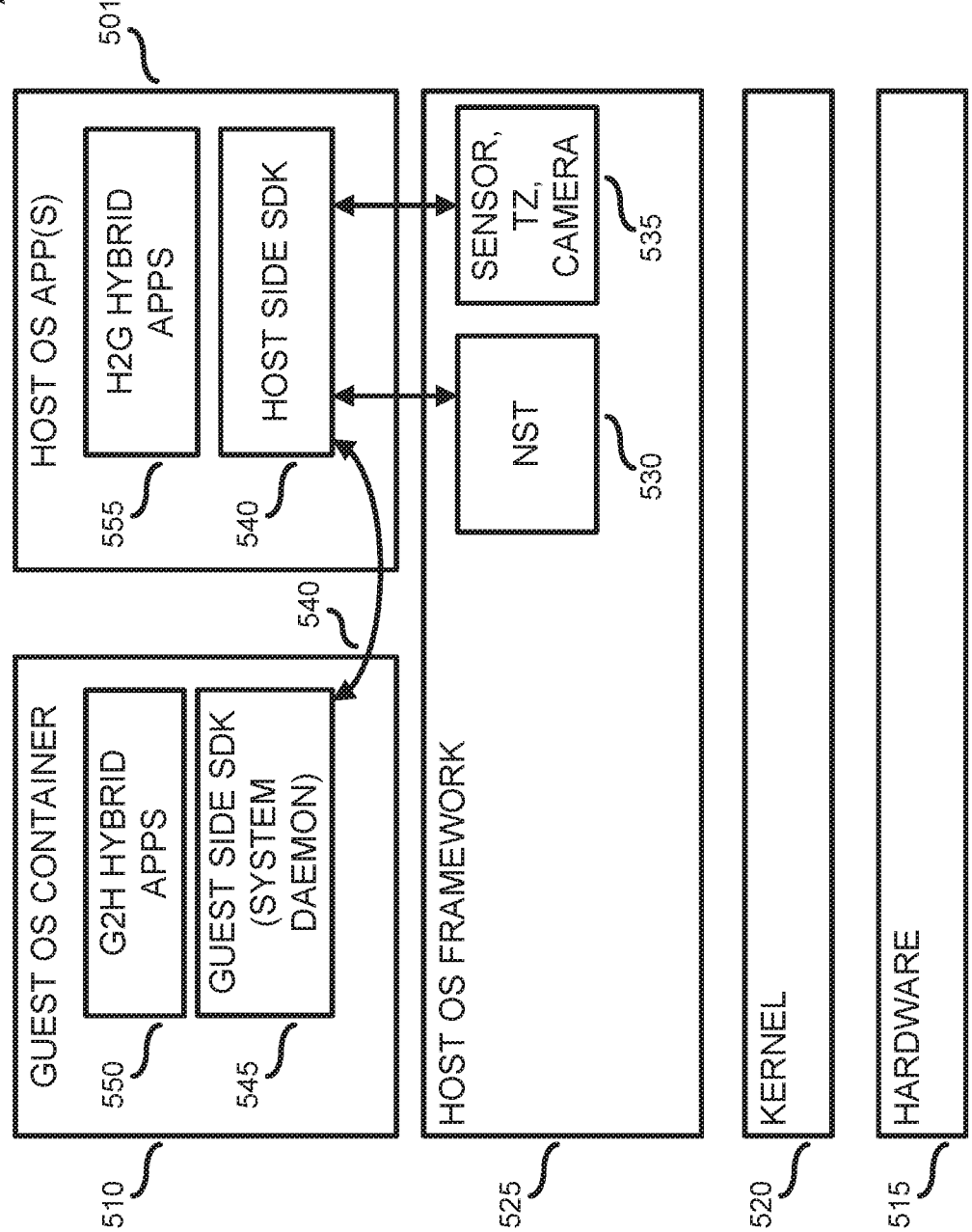
FIG. 5 illustrates an example of an architecture for implementing a command and control between a system daemon of a container providing a guest OS and an application running under the host OS, according to some embodiments of this disclosure.

FIG. 5 illustrates an example of an architecture for implementing a command and control between a system daemon of a container providing a guest OS and an application running under the host OS, according to some embodiments of this disclosure. The embodiment for architecture 500 shown in FIG. 5 is for illustration only. Other embodiments could be used without departing from the scope of the present disclosure.

As discussed elsewhere herein, simultaneously running a host OS and a guest OS container on a single device presents an array of technical challenges as well as opportunities for improvements in the performance and functionality of certain computing platforms. The technical challenges include, without limitation, managing and monitoring the lifecycle of guest OS containers. By sharing the host OS kernel with processes running under the host OS, processes operating in a guest OS container (for example, guest OS container 410 in FIG. 4) share device resources (for example, processor time and memory space) with processes running under the host OS. At times, processes running in the guest OS container may consume device resources that conflicts with the resource needs of host OS processes. For example, a process in the guest OS container may be performing a computationally expensive calculation which precludes a video application running under the host OS from operating correctly.

In certain embodiments, because processes operating in a guest OS container are, for security reasons, not fully transparent (for example, they may all be mapped to a virtual root for the guest OS container) to the host OS, certain process-specific control mechanisms used by the host OS to control host OS processes may not be available for controlling processes to resolve conflicts, such as excessive system resource consumption by processes operating in a guest OS container.

Additionally, the opportunities for improvement associated with simultaneously operating a host OS and a guest OS container on a single device, according to various embodiments of this disclosure include, without limitation, the ability to develop and operate "hybrid" applications, which can utilize the functionalities provided by a host OS, and a guest OS operating in a guest OS container.

Referring to the non-limiting example of FIG. 5, the architecture 500 for implementing a secure command and control channel 505 which connects one or more applications of host OS applications 501 with a system daemon operating in a guest OS container 510. According to certain embodiments, one or more host OS applications 501 can send commands via secure command and control channel to manage operations of guest OS container. Examples of such commands include, without limitation, commands to stop or start guest OS container 510, resize the image size of an application, and configure various container parameters. Additionally, according to certain embodiments of this disclosure, command and control channel 505 provides a mechanism by which sensor events obtained through the host OS, as well as the device status of the host OS can be propagated to guest OS container 510 in real-time. Similarly, according to various embodiments, command and control channel 505 operates as a two-way channel, through which status information of the guest OS container can also be propagated back to the host OS side. According to various embodiments, implementing command and control channel 505 as a secure, two-way communication channel facilitates the development and implementation of "hybrid" applications which can utilize features of both the host OS and the guest OS provisioned through guest OS container 510. With reference to the non-limiting example of FIG. 5, a state machine for creating and synchronizing information regarding the status of device and the lifecycle of guest OS container 510.

According to certain embodiments, architecture 500 comprises a hardware layer 515 (for example, hardware layer 205 in FIG. 2), which includes system resources, such as sensors and memory operating, through kernel 520 under the control of programs executed by a processor of the electronic device (for example, device 100 in FIG. 1) implementing architecture 500.

As shown in the illustrative example of FIG. 5, the architecture 500 further comprises kernel 520, which in this non-limiting example, is a kernel (for example, kernel 210 in FIG. 2, or kernel 405 in FIG. 4) of the host OS. According to various embodiments, kernel 520 is responsible for, without limitation, controlling resources of hardware layer 515 in response to system calls provided by processes operating in guest OS container 510 and processes (for example, processes of host OS applications 501) running under the host OS. In this illustrative example, kernel 520 is shared between host OS applications 501 and applications running in guest OS container 510, thereby providing computational efficiency gains over implementing a guest OS through a virtual machine, which would unnecessarily perform kernel-level computational operations of the guest OS.

According to some embodiments of the present disclosure, the architecture 500 comprises host OS framework 525, which is a framework (for example, host OS framework 215 in FIG. 2). As shown in this explanatory example, host OS framework 525 comprises, inter alia, a suite of application programming interfaces for building applications, as well as services for initiating and managing interactions between applications and the kernel layer 520. As shown in the non-limiting example of FIG. 5, host OS framework 525 comprises one or more name space tools (NST) 530, as well one or more APIs 535 for receiving and passing sensor events to processes of the host OS.

According to certain embodiments, NST 530 is a name space tool (for example, NST 220 in FIG. 2) configured to, without limitation, spawn guest OS container 510 as part of a boot process of the host OS, and provision and manage the privileges of guest OS container 510 to access resources of the host OS (for example, by limiting guest OS to a minimal subset of CAPs, such as described with reference to FIG. 4 of this disclosure).

Referring to the non-limiting example of FIG. 5, architecture 500 comprises a set of host OS applications 501. According to various embodiments, host OS applications 501 comprise host side software development kit (SDK) 540. According to various embodiments, host side SDK 540 comprises a set of libraries, service processes and daemons for interactions between host OS applications 501 and guest OS container 510. Non-limiting examples of interactions between host OS applications 501 and guest OS container 510 mediated by host side SDK 540 include launching applications, services or tools within guest OS container 510 from requests generated by processes of host OS applications 501, as well as launching applications, services or tools of the host OS from processes in guest OS container 510. Non-limiting examples of interactions between host OS applications 501 and guest OS container 510 further comprise, delivering results (such as sensor events) in both a guest-to-host direction and a host-to-guest direction, as well as handling data and control messages in order to expose hardware access or other generic APIs in both the host-to guest or guest to host directions. Further, non-limiting examples of host-to-guest and guest-to-host interactions facilitated by a daemon or other component of host side SDK include handling configuration management on either the host side or guest OS container 510. According to various embodiments, host side SDK further comprises a state machine to monitor the lifecycle of guest OS container 510.

According to certain embodiments of this disclosure, secure command and control channel 505 comprises a privileged socket channel between host side SDK 540 and guest side SDK 545, which according to various embodiments, comprises a system daemon. In some embodiments, secure communication channel is protected with the security structures (for example, permissions, and kernel-based access controls) of the host OS. For example, in embodiments in which the host OS utilizes the LINUX kernel, secure command and control channel 505 may be protected using SELinux access controls. According to certain embodiments, secure command and control channel is established by NST 530, such as through communications between NST 530 and host side SDK 540, and communications between NST 530 and guest side SDK through a separate, pre-existing communication channel (for example, secure communication channel 250 in FIG. 2).

Referring to the non-limiting example of FIG. 5, the architecture 500 comprises at least two sets of hybrid—in the sense that they utilize resources or features (for example, APIs provided by host OS framework 525 and APIs provided by a framework of a guest OS running in guest OS container 510) of both the host OS and guest OS) applications. According to certain embodiments, access and utilization (for example, by passing results to an application) of resources and features across a guest OS—host OS partition is conducted through secure command and control channel 505. Guest-to-host ("G2H") hybrid applications 550 comprise applications running under the guest OS within guest OS container 510, but which are able, by communicating over secure command and control channel 505 through a system daemon provided by guest side SDK 545, to access host OS resources, for example, sensors, TrustZone processing resources and a device camera, through these resources' API 535. Similarly, host-to-guest ("H2G") hybrid applications 555 comprise applications running under the host OS, but which are able to access resources provided through the guest OS provisioned in guest OS container 510 through secure command and control channel 505. As a non-limiting example, in certain embodiments, where the host OS is a version of ANDROID, and the guest OS is LINUX, LINUX features which become available to H2G hybrid applications 555 include, without limitation, the ability to dynamically call the libopenssl and libboost libraries, as well as PYTHON run shell commands.

Figure 6:
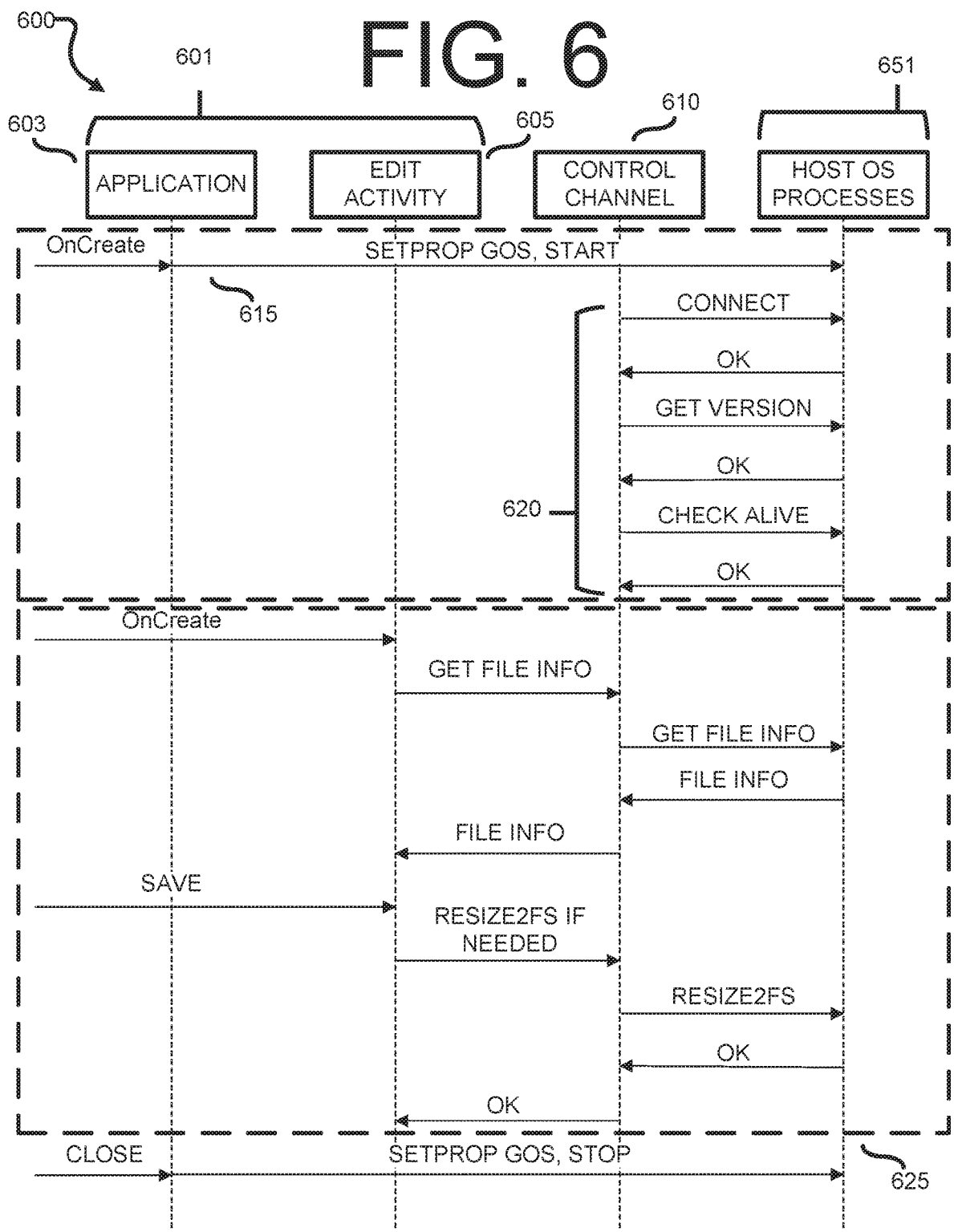
FIG. 6 illustrates an example of the operation of a secure command and control channel, according to various embodiments of this disclosure in the context of a resize image operation.

FIG. 6 illustrates an example of the operation of a secure command and control channel, according to various embodiments of this disclosure in the context of a resize image operation. The embodiment for the operation 600 shown in FIG. 6 is for illustration only. Other embodiments could be used without departing from the scope of the present disclosure.

Referring to the non-limiting example of FIG. 6, a sequence 600 for configuring a secure command and control channel (for example, secure command and control channel 505 in FIG. 5), and then initiating a resize image operation for a file system in a user space provided by a host OS from an application 603, which belongs to a set 601 of applications and processes running in a guest OS container (for example, guest OS container 225 in FIG. 2).

Referring to the non-limiting example of FIG. 6, applications and processes within the set 601 of applications running in a guest OS container, comprise a first application 603, which according to various embodiments, is a hybrid guest-to-host application (for example, G2H application 550 in FIG. 5, which can access resources of the host OS. According to certain embodiments, applications and processes within the set 601 of applications and processes the guest OS container further comprise the "Edit Activity" tool 605, which in certain embodiments, is a program provided in a guest side SDK (for example, guest side SDK 545 in FIG. 5) which is configured to communicate with a counterpart host side SDK (for example, host side SDK 540 in FIG. 5 which operates as part of a set of host OS process 651, once secure command and control channel 610 between the two is established.

According to certain embodiments, sequence 600 comprises an initial step 615, wherein application 603 connects with one or more processes of host OS processes 651 to establish secure command and control channel 610. In certain embodiments, the connection between application 603 and a host OS process of host OS processes 651 to set up secure command and control channel 610 occurs through a pre-existing channel between an NST (for example, NST 220 in FIG. 2) in the host OS framework and a process in the guest OS container.

As shown in the illustrative example of FIG. 6, once established, secure command and control channel 610 periodically interacts with host OS processes to confirm the operation of secure command and control channel 610. The interaction associated with maintaining and confirming the operation of secure command and control channel 610 are shown by the set of operations 620.

Referring to the non-limiting example of FIG. 6, the commands sequence associated with resizing an image of a file in host OS initiated by a process of application 603 of guest OS container are shown in box 625. While the specific sequence of commands shown in box 625 does not require detailed explanation, attention is directed to the fact that, in certain embodiments according to the present disclosure, each set of commands (for example, "RESIZE2FS IF NEEDED") from the application 603 to a process of host OS processes 651 passes through command and control channel 610. Similarly, the data designated "FILE INFO" passes from host OS processes 651 to "Edit Activity" tool 605 via control channel 610. Thus, in certain embodiments, control channel 610 provides a secure, dedicated two-way conduit for commands and data between a host OS and a guest OS container.

Figure 7:
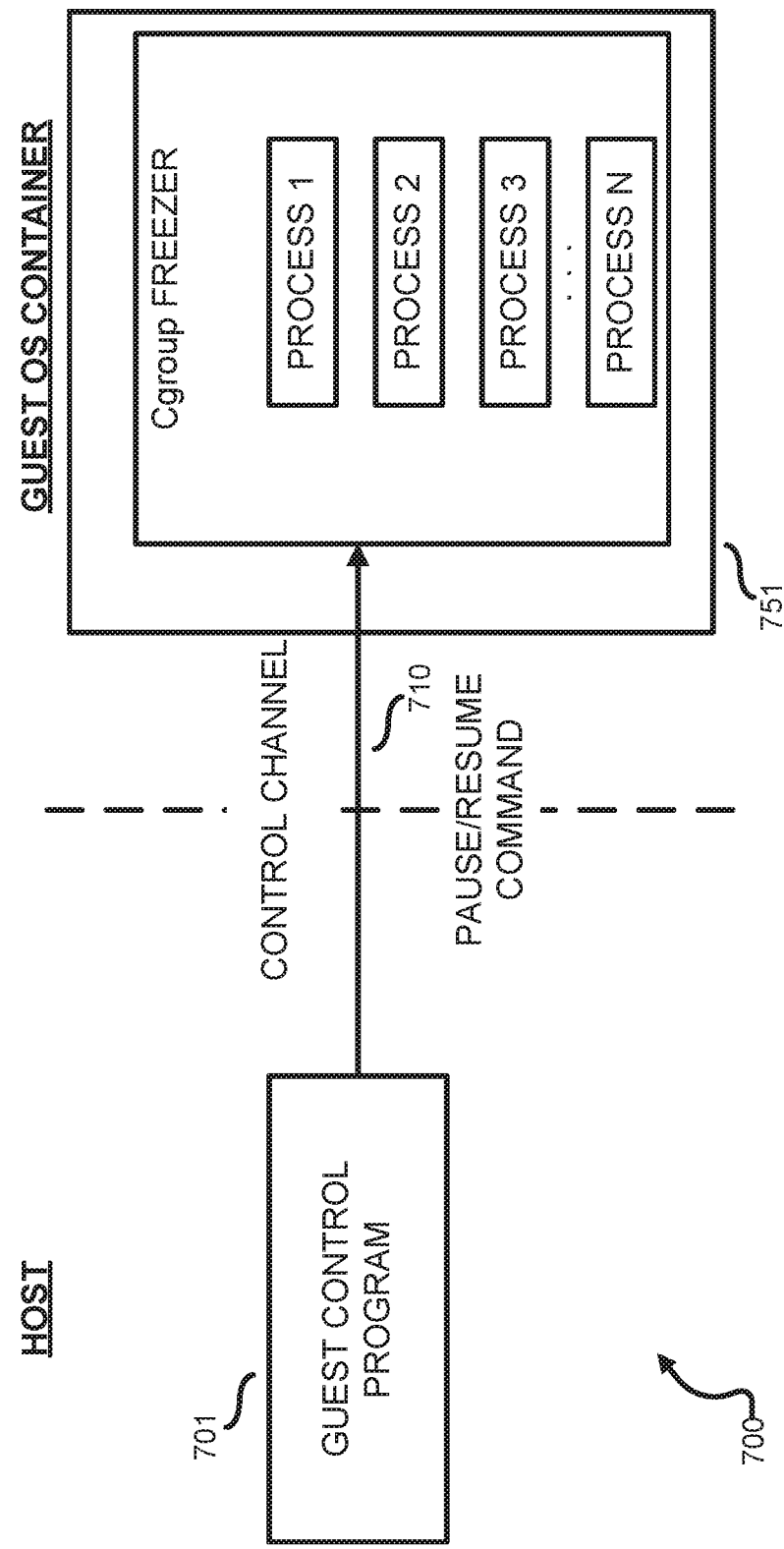
FIG. 7 illustrates an example of an architecture for controlling processes within a container for a guest OS from a program on a host OS, according to certain embodiments of this disclosure.

FIG. 7 illustrates an example of an architecture for controlling processes within a container for a guest OS from a program on a host OS, according to certain embodiments of this disclosure. The embodiment of the architecture 700 shown in FIG. 7 is for illustration only. Other embodiments could be used without departing from the scope of the present disclosure.

As noted elsewhere in this disclosure, the technical challenges associated with implementing a host OS and a guest OS container include, without limitation, managing situations in which both the host OS and the guest OS require large amounts of system resources, or situations where the host OS urgently requires additional, or specific resources (for example, receiving a video chat call while an application in a guest OS is performing a large hash or other computationally expensive task).

In certain embodiments according to this disclosure, because processes within a guest OS container are in a guest namespace which is hidden from the host OS (for example, by mapping processes in the container to the same virtual root), the host OS is not able to implement per-process control which targets individual processes running in a guest container. Additionally, while the host OS can, for example, release device resources by ending the lifecycle of the container, in many cases, this represents an unacceptably "brute force" solution to freeing up device resources for the host OS.

In certain embodiments according to this disclosure, device resources (for example, processing threads) allocated to guest OS container processes can be made available to the host OS by leveraging kernel (for example, kernel layer 210 in FIG. 2) features which enable the creation of defined groups of kernel tasks and process identifiers (for example, UIDs). According to certain embodiments, each of these defined groups of kernel tasks can, on command, or in response to satisfaction of a predefined condition, be "frozen." As used in this disclosure, "freezing" encompasses pausing a kernel task, such that the tasks still occupy space in memory (e.g., their state is preserved), but the CPU, network, or power resources necessary to perform the tasks are made available to other processes. Thus, even though the precise identifiers of resource-intensive processes in a guest OS container are, in certain embodiments, not visible to the host OS, by variously "freezing" groups of kernel processes associated with a common process identifier (for example, a UID) of guest OS container, a modulated response (as opposed to a total response, such as closing the guest OS container) to excessive consumption of device resources by processes in the container can be achieved.

Referring to the non-limiting example of FIG. 7, the architecture 700 comprises, on the host OS side, a guest control program ("GCP") 701. According to various embodiments, GCP 701 is a program of the host OS (for example, a component of an NST) configured to generated and transmit "pause" commands, causing groups of kernel processes associated with a common process identifier to be "frozen" and give up their CPU, power r network resources, as well as to generate and transmit "resume" commands, which cause groups of "frozen" kernel processes to resume processing. In certain embodiments, the kernel feature which permits "freezing" defined groups of kernel tasks and processes is the "Cgroup Freezer."

As shown in the non-limiting example of FIG. 7, GCP 701 can, in some embodiments, issue "freeze" commands on demand (for example, in response to a user input specifically requesting the freezing of certain processes), or dynamically, by detecting events or conditions on the host OS side to trigger the transmission of pause and resume commands to guest OS container 751.

According to certain embodiments, examples of conditions triggering the transmission of a "freeze" or "pause" command by GCP 701 include, without limitation, detection of certain resource availability events, such as the GCP detecting that the device (for example, device 100 in FIG. 1) is low on power, or is disconnected from a power source. Further examples of resource availability events which can trigger a "freeze" command include, the GCP detecting that the device is running low on one or more of network resources or CPU resources. Still further examples of conditions triggering the transmission of a "freeze" or "pause" command by GCP 701 include, without limitation, GCP 701 becoming a background process on the host side, with another hos process running in the foreground, or the GCP detecting that the device screen is off.

According to various embodiments, examples of conditions triggering GCP 701 to transmit a "thaw" or "resume" command include, without limitation, a user request to send a resume command, certain resource availability events, such as GCP 701 detecting that the device is connected to a power source, or GCP 701 detecting that the device has adequate network or CPU resources for the frozen processes. Further examples of conditions or events triggering the generation and transmission of a "resume" command by GCP 701 include, without limitation, GCP 701 becoming a foreground process on the host side, and GCP 701 detecting that a screen of the device has been turned on.

As shown in the illustrative example of FIG. 7, GCP 701 transmits pause and resume commands to guest OS container 751 through a secure command and control channel 710. According to various embodiments, secure command and control channel 710 (for example, secure command and control channel 505 in FIG. 5) connects GCP 701 through a host-side SDK (for example, host side SDK 540 in FIG. 5) with a guest side SDK providing a system daemon (for example, guest side SDK 545 in FIG. 5).

According to certain embodiments, certain tasks in a defined group of tasks associated with processes executing in guest OS container 751 are assigned to groups of tasks (for example, Cgroups) which can be frozen in response to a "pause" command from GCP 701. According to various embodiments, issuance of a "pause" command to "freeze" certain kernel tasks may cause more than one process operating in guest OS container 751 to give up CPU, power or network resources to the host OS. As shown in the illustrative example of FIG. 7, the number of running guest OS processes which may be affected by a group freeze command can vary.

Figure 8:
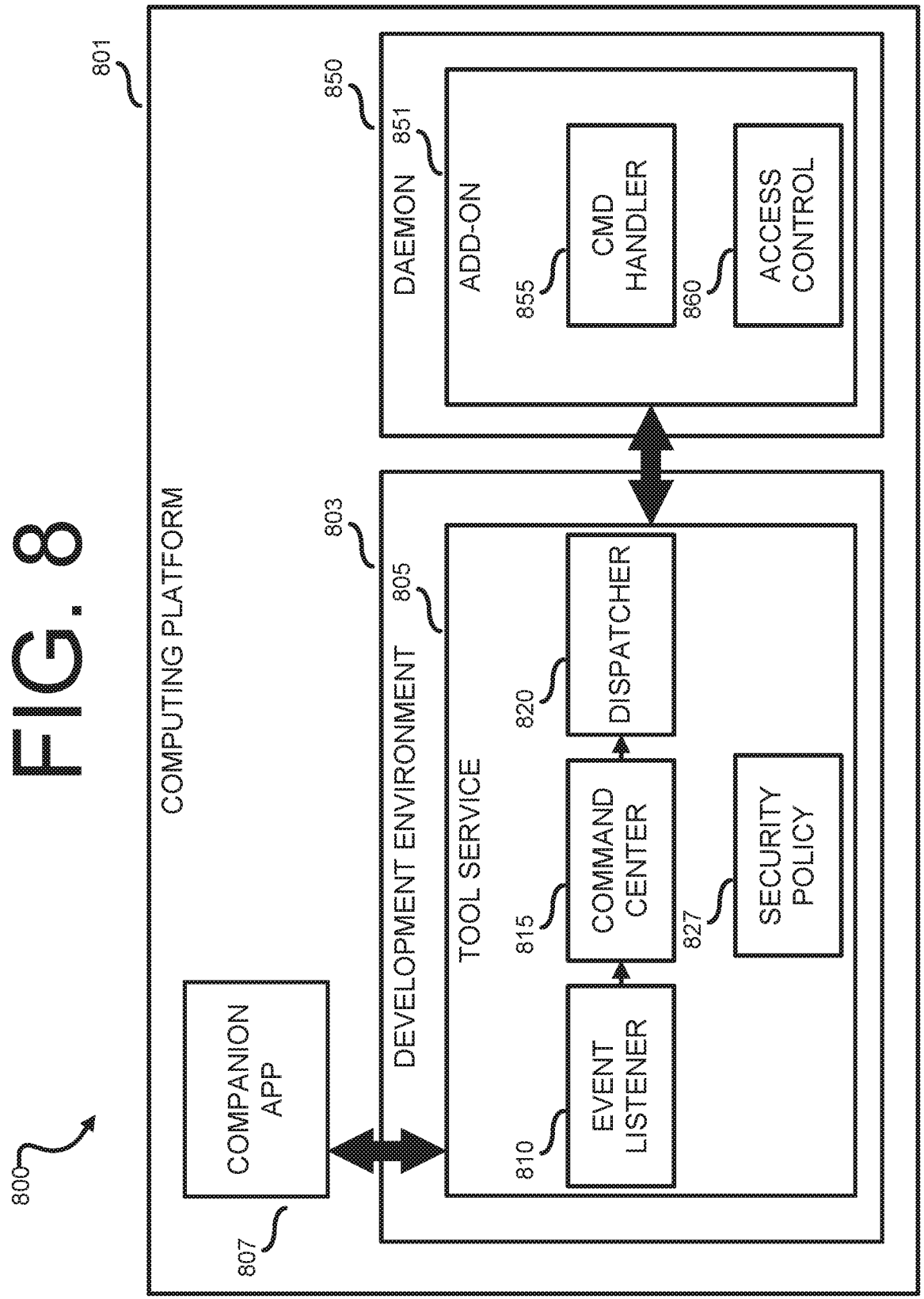
FIG. 8 illustrates an example of an architecture for establishing a communication channel between a development environment on a device and the device itself, according to some embodiments of this disclosure.

FIG. 8 illustrates an example of an architecture 800 for establishing a communication channel between a development environment on a device and the device itself, according to some embodiments of this disclosure. The embodiment of the architecture 800 shown in FIG. 8 is for illustration only. Other embodiments could be used without departing from the scope of the present disclosure Implementing a mobile device application development environment, with debugging tools, and a command line interface, as well as an instance of the application on a single mobile device, presents both technical challenges and opportunities for implement in the operation and functionality of the mobile device. Historically, development and debugging of applications for mobile devices was carried out, in part, or in whole, on platforms other than the mobile device (for example, a desktop or laptop computer).

As one example of a popular hardware setup for developing and debugging a mobile application, a development tool, or suite of tools operates on a first computing platform (for example, a desktop or a laptop) running under a first OS, which is connected, for example, by a USB cable, to a mobile device running under a second OS, and providing a daemon through which the development machine can communicate with the mobile device. In this example, the development tool on the first computing platform also interacts with the mobile device, such as by installing, uninstalling, and invoking and instrument application, and by obtaining information about the mobile device and an instance of the application under development running on the mobile device.

Certain software tools (for example, the ANDROID Debug Bridge ("ADB")) for implementing the above-described two-device hardware setup for developing and debugging a mobile application implement a three component architecture comprising a client, a server and a daemon. In such architectures, the client and server modules run as processes on the first computing platform, and the daemon runs as a process on the mobile device. Often, the client can be invoked from a command-line interface presented on the first computing platform, and can send commands, through the server to the daemon on the mobile device. The daemon is, in many cases, a background process running on the mobile device, which runs the commands sent by the client. In the above-described popular debugging and development architecture, the server runs as a background process on the first computing platform and manages the communication between the client and the daemon. The above-described hardware setup, which is popular with developers, is typically predicated on a limited set of communication options between the server process and the daemon on the mobile device, such as a BLUETOOTH or USB connection. In many cases, logical connections within a single mobile device fall outside the set of communications which can support the above-described server-client-daemon connection between an application development environment and hardware for running an instance of the application under development.

According to certain embodiments, a server-client-daemon connection between a development environment on an electronic device (for example, device 100 in FIG. 1) and the hardware of the same device as a hardware platform for developing and debugging an instance of the application, can be provided through architecture 800 in FIG. 8.

Referring to the non-limiting example of FIG. 8, the architecture 800 is implemented on a single computing platform 801 (for example, device 100), which, in some embodiments, is a mobile device, such as a smartphone or tablet running a host OS. According to some embodiments, implementing architecture 800 on a single, highly portable computing platform such as a smartphone is, from a user perspective, desirably convenient, in that developers can work on application tasks on short notice and on the go.

According to certain embodiments, the architecture 800 comprises development environment 803 (also sometimes referred to as an integrated development environment, or "IDE"), which in certain embodiments, is a suite of software tools to facilitate, without limitation, development, compiling, debugging, release management and version control of an application to be run on computing platforms such as computing platform 801. Examples of development environments include, without limitation, MICROSOFT Visual Studio, ANDROID Studio, and Xcode. In certain embodiments, development environment 803 is designed to operate under an operating system other than the host OS of computing platform 801. Accordingly, in some embodiments, development environment 803 runs in a guest OS container of computing platform 801, which is established and managed according to certain embodiments of this disclosure.

As shown in the illustrative example of FIG. 8, the ability to connect development environment 803 to the rest of computing platform 801 in a way that replicates the functionality provided by a server-client-daemon connection utilized popular hardware setups for application is implemented by tool service 805 and daemon 850.

According to various embodiments tool service 805 is a system service which starts when computing platform 801 boots up and runs continuously afterwards. In certain embodiments, tool service 805 is provided as a component within the host OS framework (for example, host OS framework 215 in FIG. 2). In some embodiments, tool service 805 is provided as part of a name space tool (NST) service (for example, NST 220) to facilitate operation in cases where development environment 803 uses a guest OS and operates in a guest OS container established on computing platform 801. As shown in the illustrative example of FIG. 8, tool service 805 receives, as inputs, control commands from a companion application 807, which in certain embodiments, is an application running under the host OS of computing platform 801, and operates, without limitation, as a user-configured and user-controlled "on/off" switch for tool service 805. According to various embodiments, companion application 807 also serves an interface through which a user can manage the functionality provided by tool service 805. As such, in addition to turning tool service 805 on and off, in certain embodiments, companion application 807 provides one or more of showing information as to the current status of tool service 805, providing a history of commands sent to tool service 805, a history of special events captured by tool service 805, and providing a visual user interface for managing tool service 805.

Further, tool service 805 receives, as inputs, notifications of certain external events (for example, plugging or unplugging computing platform 801 from a docking station) affecting the operation of computing platform 801. Additionally, tool service 805 receives, as inputs, commands (for example, install and uninstall commands) generated from within development environment 803 controlling the operation of an instance of the application under development running under the host OS of computing platform 801. According to various embodiments, tool service 805 outputs commands to daemon 850 for operations to be carried out in the host OS environment of computing platform 801.

Referring to the non-limiting example of FIG. 8, tool service 805 comprises an event listener 810, a command center 815, a dispatcher 820 and a security policy 827, which in various embodiments, are implemented as software modules of tool service 805.

According to various embodiments, event listener 810 is configured to listen for selected events and, when a selected event occurs, provide a notification of the event (for example, by sending an intent) to command center 815. According to various embodiments, events for which event listener 810 listens for include, without limitation, external events, such as computing platform 801 docking and becoming undocked from a docking station. Additionally, in some embodiments, events monitored by event listener 810 further comprise events associated with development environment 803, such as commands for operations to be performed by an application under development, or commands to obtain data regarding computing platform 801 (for example, an identification of the version of the host OS running on computing platform 801).

In some embodiments according to this disclosure, command center 815 handles events (including external events) from event listener 810 and user control commands from companion application 807. According to various embodiments, command center 815 digests context regarding computing platform 801's current status from event listener 810 and determines an operation or command to be passed to daemon 850 via dispatcher 820.

As shown in the non-limiting example of FIG. 8, security policy 827 operates to restrict access to tool service 805 by unauthorized processes, as tool service 805 has, in certain embodiments, high-level permissions to access resources of computing platform 801. Referring to the non-limiting example of FIG. 8, dispatcher 820 issues commands to daemon 850 over a secure communication channel 825 (for example, secure command and control channel 505 in FIG. 5) established between tool service 805 and daemon 850. According to various embodiments of this disclosure, daemon 850 is a program running under the host OS of computing platform 801, which operates to receive and handle commands sent by dispatcher 820 over secure communication channel 825.

In some embodiments according to this disclosure, daemon 850 comprises an add-on module 851, a command (CMD) handler 855 and access control module 860. As discussed elsewhere in this disclosure, in certain embodiments, dispatcher 820 generates a private/public key pair for communications over secure communication channel 825. According to various embodiments, add-on 855 saves a copy of the public key of the private/public key pair generated by dispatcher 820. In certain embodiments, command handler 855 receives commands from dispatcher 820 and passes them to processes running under the host OS of computing platform 801. Additionally, according to various embodiments, access control module 860 operates to restrict access to secure communication channel 825 to host OS processes other than daemon 850, and to authenticate (for example, by confirming that they are signed with the private key of the private/public key pair generated by dispatcher 820) commands and data passed to daemon 850.

Figure 9:
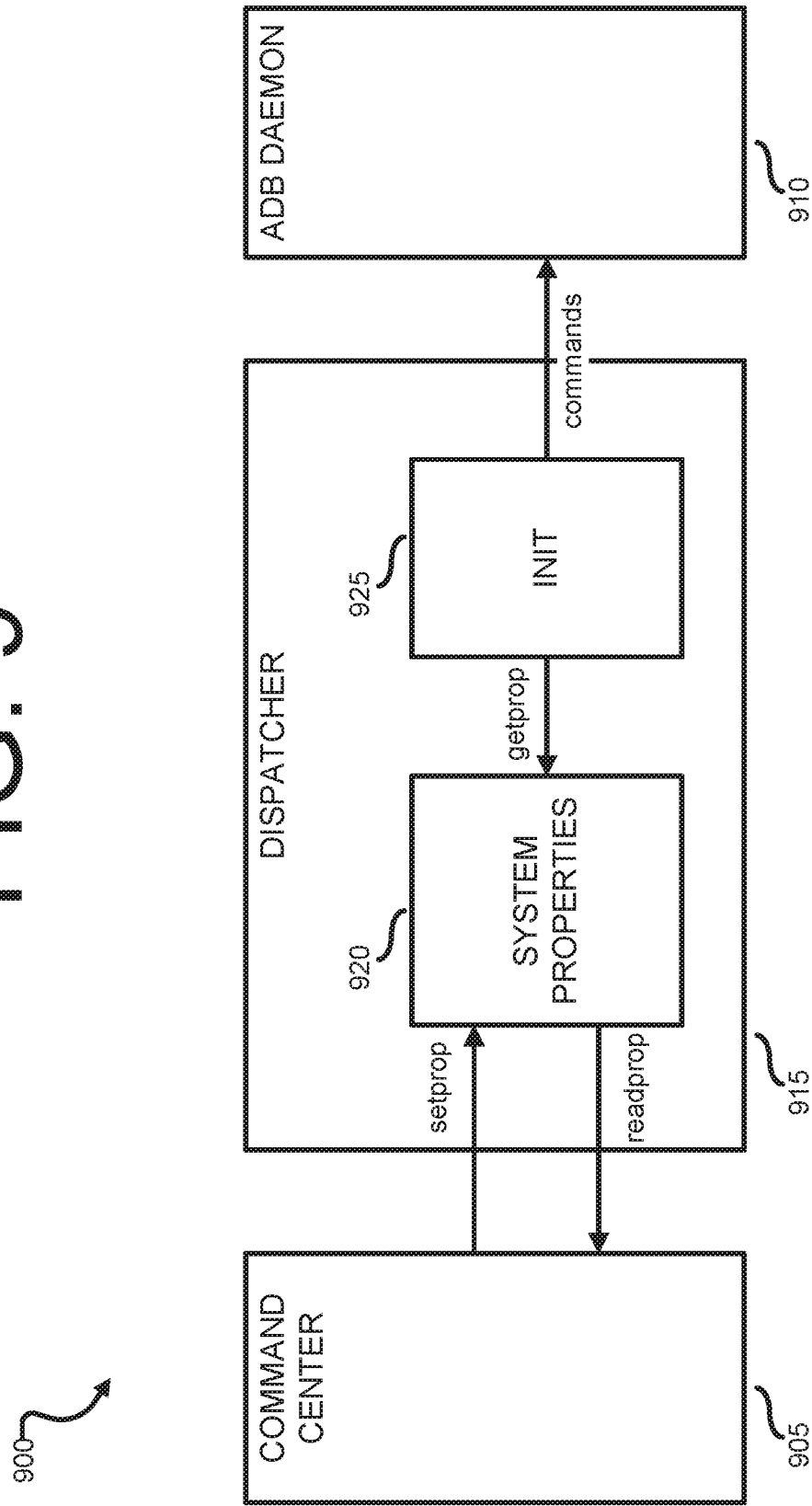
FIG. 9 illustrates aspects of establishing an intradevice connection between a dispatcher provided by a tool service and a daemon operating under the host OS to connect a development environment with a device, according to various embodiments of this disclosure.

FIG. 9 illustrates aspects of establishing an intradevice connection between a dispatcher provided by a tool service and a daemon operating under the host OS to connect a development environment with a device, according to various embodiments of this disclosure. The embodiment an architecture 900 shown in FIG. 9 is for illustration only. Other embodiments could be used without departing from the scope of the present disclosure.

Referring to the non-limiting example of FIG. 9, aspects of the architecture 900 comprising a command center and dispatcher provided by a tool service (for example, tool service 805 in FIG. 8) and a daemon (for example, daemon 850 in FIG. 8) are illustrated.

As shown in the illustrative example of FIG. 9, the architecture 900 comprises a command center 905, which, for the purposes of the explanatory example of FIG. 8, can be considered equivalent to command center 815 in FIG. 8. According to various embodiments, the architecture 900 further comprises daemon 910, which comprises a process running under the host OS of a computing platform (for example, device 100 in FIG. 1), which is configured to, without limitation, receive commands over a secure communication channel from dispatcher 915. For the purposes of the explanatory example of FIG. 8, daemon 910 can be considered equivalent to daemon 850 in FIG. 8.

According to various embodiments, to establish a communication channel (for example, secure communication channel 825 in FIG. 8), dispatcher 915 triggers a series of method calls (in some embodiments, the "setprop," "readprop" and "getprop" methods) to set a set of system properties 920 for development and debugging across the communication channel. Additionally, in certain embodiments, as part of initially setting up the communication channel, command center 905 generates a private/public key pair for the communication channel and dispatcher 915 sends initial setup commands and the public key of the public key to daemon 910. Additionally, as part of the initial set up of the communication channel, a companion application (for example, companion application 807 in FIG. 8 may use a program of the host OS (for example "Init" program 925 to monitor system properties 920 and issue updates regarding system properties to daemon 910.

Figure 10:
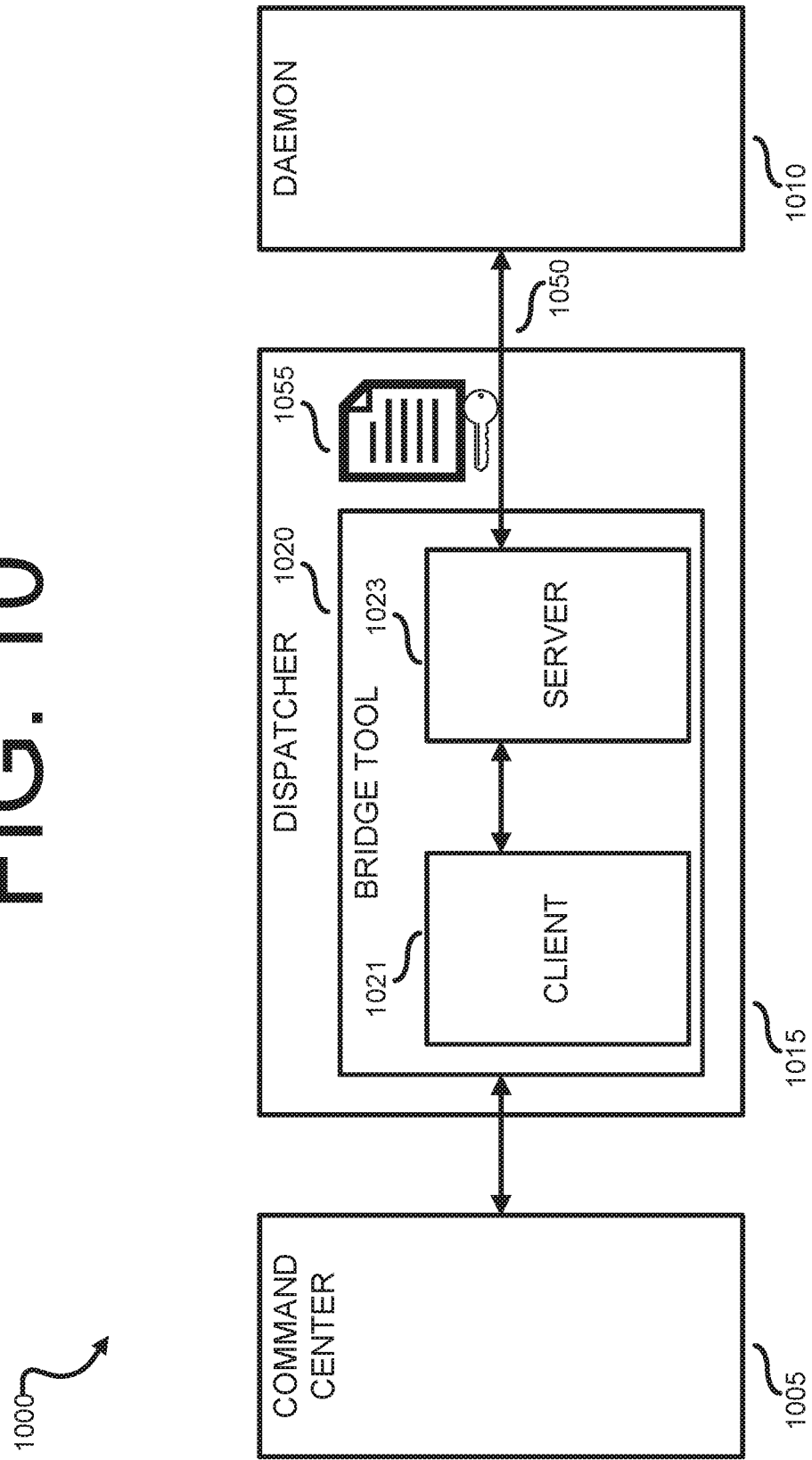
FIG. 10 illustrates aspects of an example of an established intradevice connection between a dispatcher and a daemon, according to certain embodiments of this disclosure.

FIG. 10 illustrates aspects of an example of an established intradevice connection between a dispatcher and a daemon, according to certain embodiments of this disclosure. The embodiment an architecture 1000 shown in FIG. 10 is for illustration only. Other embodiments could be used without departing from the scope of the present disclosure.

Referring to the non-limiting example of FIG. 10, a command center 1005 (for example, command center 905 in FIG. 9) and daemon 1010 (for example, daemon 910 in FIG. 9), are connected via a communication channel 1050 established between dispatcher 1015 and daemon 1010. According to various embodiments, communication channel 1050 is established according to the example described with reference to FIG. 9 of this disclosure.

According to certain embodiments, once communication channel 1050 is established, dispatcher 1015's role pivots from handling aspects of establishing the connection, to implementing a bridge tool 1020, which provides a client functionality 1021, which receives commands and data from processes within a development environment (for example, development environment 803 in FIG. 8), and a server functionality 1023, which transmits and receives commands over communication channel 1050. According to certain embodiments, bridge tool 1020, or another process of dispatcher 1015 wraps commands (for example, command 1055) with the previously generated private key of the private/public key pair generated by command center 1005.

Figure 11:
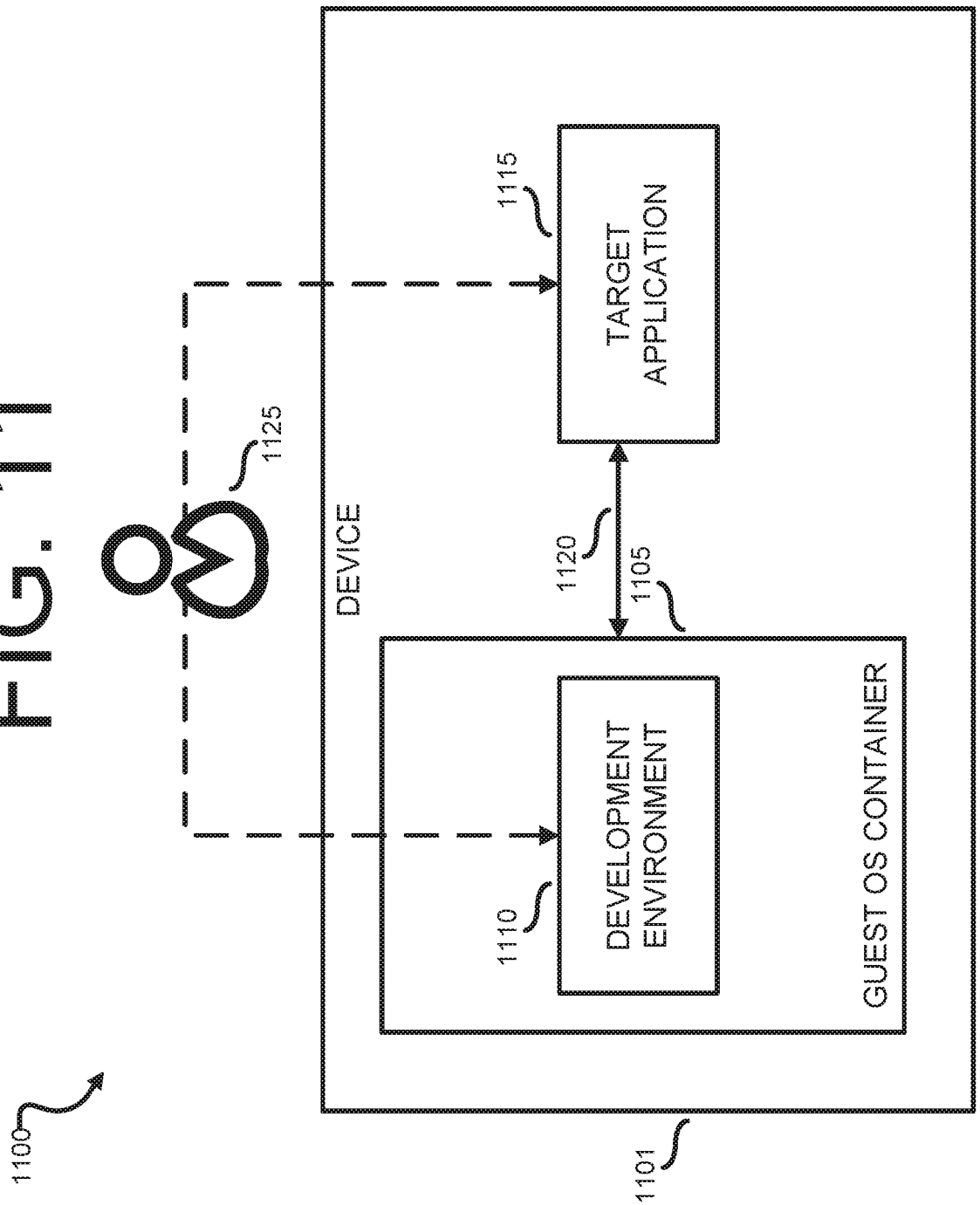
FIG. 11 illustrates an example of an environment for debugging an application on a single computing platform, according to some embodiments of this disclosure.

FIG. 11 illustrates an example of an environment 1100 for debugging an application on a single computing platform, according to some embodiments of this disclosure. The embodiment the environment 1100 shown in FIG. 11 is for illustration only. Other embodiments could be used without departing from the scope of the present disclosure.

For many advanced users, debugging an application is a multi-threaded mental process, wherein the user simultaneously views, considers and interacts with a first user interface providing with debugging tools of a development environment, and a second user interface, provided by the application itself. This approach to debugging is intuitive and permits users to readily observe deficiencies in the appearance and operation of an application based on what the application presents through its own UI, and at the same time, analyze and address the identified issues in the underlying code through the debugging tools. Put differently, many popular and intuitive workflows for debugging applications require that the UI for the debugging tools and the UI of the application being debugged be provided simultaneously and without restrictions (for example, one UI freezing or pausing in response to user interaction to the other UI).

Referring to the non-limiting example of FIG. 11, the environment 1100 comprises a computing platform or device 1101 (for example, an embodiment of device 100 in FIG. 1, such as a smartphone), which is running a host OS. According to certain embodiments, environment 1100 comprises a guest OS container (for example, guest OS container 225 in FIG. 2) that provides a development environment 1110 (for example, development environment 803 in FIG. 8) which includes a suite of debugging tools running under a guest OS operating in guest OS container 1105. The environment 1100 further comprises a target application 1115, which, in certain embodiments, is an application running under the host OS of device 1101, and which is being debugged or developed through development environment 1110. In this non-limiting example, guest OS container is connected to target application 1115 through a secure communication channel 1120 (for example, secure communication channel 825 in FIG. 8), through which commands from the development environment supporting the debugging process (for example, commands to pause the application) can be passed to target application 1115.

According to various embodiments, user 1125 is debugging target application 1115 using debugging tools provided through development environment 1110, and, to facilitate this process, needs both development environment 1110 and target application 1115 running simultaneously and without restrictions on the operation or functionality of UIs provided by either development environment 1110 or target application. In certain cases, this presents technical challenges, as certain host OS (in particular, OS for mobile devices) treat guest OS container 1105 as an application, and do not allow multiple applications to run simultaneously. Instead of allowing both target application 1115 and development environment 1110 to run simultaneously as desired, only one will run, while the other will appear in the background, without any UI updates or support for user interaction.

Figure 12:
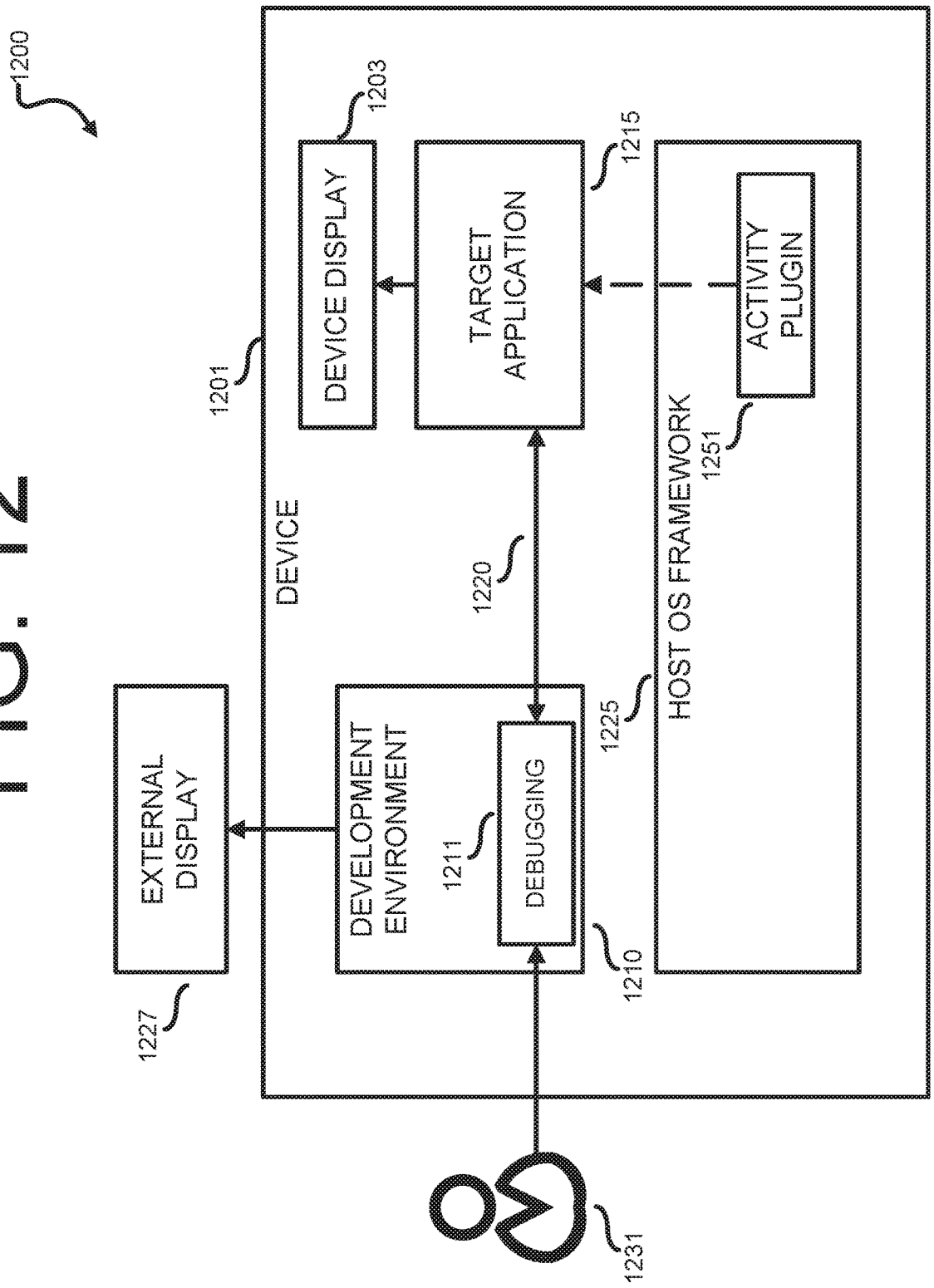
FIG. 12 illustrates an example of an environment supporting simultaneous operation of a development environment and a target application on a single computing platform, according to some embodiments of this disclosure.

FIG. 12 illustrates an example of an environment 1200 supporting simultaneous operation of a development environment and a target application on a single computing platform, according to some embodiments of this disclosure. The embodiment of the environment 1200 shown in FIG. 12 is for illustration only. Other embodiments could be used without departing from the scope of the present disclosure.

Referring to the non-limiting example of FIG. 12, the environment 1200 comprises a device 1201 (for example, device 1101 in FIG. 11 or device 100 in FIG. 1), which runs a host OS, and comprises a device display 1203 (for example, a touchscreen). According to various embodiments, the environment 1200 comprises a development environment 1210 (for example, development environment 1110 in FIG. 11). In some embodiments, development environment 1210 operates under the host OS of device 1201. In some embodiments, development environment operates under a guest OS implemented through a guest OS container (for example, guest OS container 225 in FIG. 2). According to various embodiments, development environment 1210 comprises a debugging tool 1211, which is a suite of development tools which require the simultaneous, unrestricted operation of development environment 1210 and a target application 1215 (for example, target application 1115 in FIG. 11) which is being developed and debugged through development environment 1210.

According to various embodiments, development environment 1210 can communicate with target application 1215 through a secure communication channel (for example, secure communication channel 1120 in FIG. 11). Further, in certain embodiments, debugging tool 1211 can communicate with target application 1215, through one or more processes in host OS framework 1225, such as a communication channel between a guest OS container and an NST operating in host OS framework 1225, or a debugging-specific service module provided through host OS framework 1225.

Further, as shown in the non-limiting example of FIG. 12, development environment 1220 is, in certain embodiments, connected to an external display 1227 (for example, an external computer monitor). Thus, in certain embodiments, while the computational processes associated with providing both development environment 1210 and running target application 1215 are performed by device 1201, the visual experience of the debugging process is provided across two viewing devices, with, for example, the GUI of the development environment on external display 1227, and the GUI of target application 1215 on device display 1203. In this way, the debugging experience provided to user 1231 retains the familiar look and feel of certain two-machine hardware configurations, while, at the same time, textually rich content (for example, code, or activity reports) provided by debugging tool 1211 can be presented at a size and resolution which may be easier to read than on device display 1203. Further, by presenting the GUI of target application 1215 on device display 1203, the operation of the GUI itself (for example, ensuring that it responds correctly to touches, swipes and other input gestures) can be more easily debugged.

According to various embodiments, host OS framework 1225 comprises an activity plugin 1251, which operates to control the activity status of target application 1215, such that, when a user (for example, user 1231) is also running debugging tool 1211 in development environment 1210, the user interface (UI) of target continues to flow (i.e., is not paused). In various embodiments, activity plugin 1251 is part of the module(s) of host OS framework 1225 which manage application activity lifecycles. According to some embodiments, activity plugin 1251 is activated at the beginning of the debug process (for example, when debugging tool 1211) is launched. In certain embodiments, activity plugin 1251 is notified of the launch of debugging tool 1211 through other processes of the host OS framework which are communicatively connected to debugging tool 1211.

In embodiments where development environment 1210 is running in a guest OS container, activity plugin 1251 stores an identifier of the guest OS container (as an application identifier) in which debugging tool 1211 is operating and an identifier of target application 1215. Without modifying the code of target application 1215, activity plugin 1251 prevents target application 1215 from pausing or going to sleep when debugging tool 1211 is in the foreground, and likewise, prevents debugging tool 1211 from pausing or going to sleep when target application 1215 is running in the foreground.

FIG. 13 illustrates operations of an example of a method 1300 for implementing a guest OS using containers, according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or processing circuitry, for example, a mobile device.

Referring to non-limiting example of FIG. 13, the operations of 1300 can be implemented on a computing platform implementing a host OS (for example, a smartphone, tablet, or device 100 in FIG. 1), through software, hardware, or a combination thereof.

According to various embodiments, at operation 1305, the host OS of the mobile platform spawns a name space tool (for example, NST 220) as part of a boot process (for example, spawning NST process 355 of FIG. 2 from init process 301 of FIG. 2). As shown in the non-limiting example of FIG. 13, according to certain embodiments, the NST has root (or sudo-level) privileges to access resources of the host OS.

In some embodiments according to this disclosure, at operation 1301, the NST spawns a guest OS container (for example, guest OS container 225 in FIG. 2, or guest OS container 410 in FIG. 4). As shown in the illustrative example of FIG. 2, in some embodiments, the container (and processes running in the container) are mapped to a dedicated domain in the host OS. As one illustrative example of mapping a guest OS container to a dedicated domain, NST process 357 in FIG. 3 is mapped to the domain "GOS_CONT," as are guest OS processes 360 in the same figure.

As shown in the illustrative example of FIG. 13, at operation 1315, the NST drops one or more root privileges of the host OS which were inherited as part of spawning the NST, in response to spawning the guest OS container (for example, GOS processes 360 in FIG. 3 are associated with a smaller set of privileges than the "root" and "gosroot" level privileges of NST processes 355 and 357).

Figure 14B:
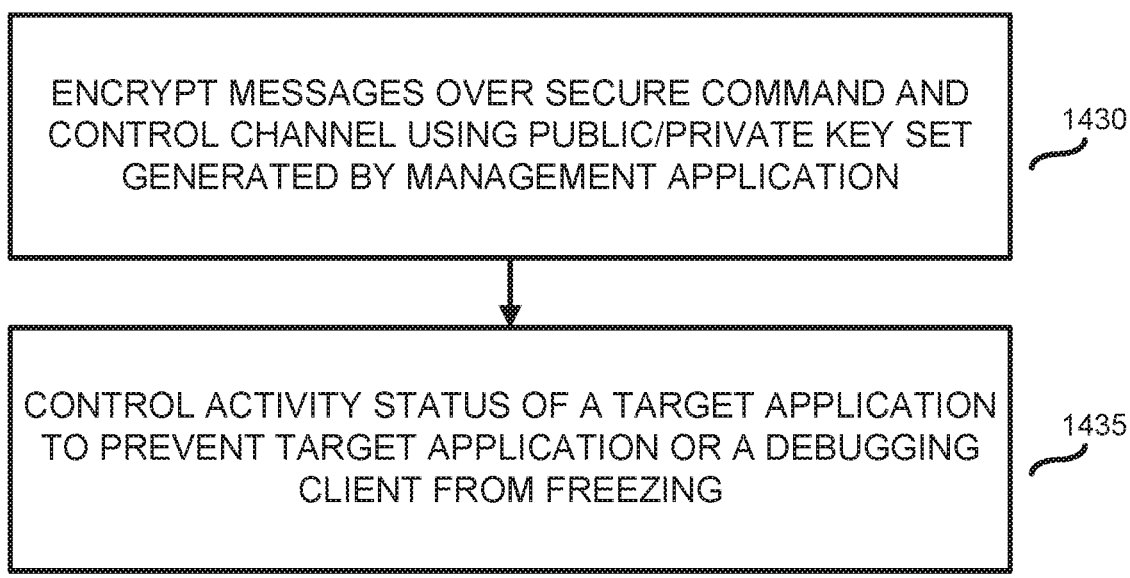

FIGS. 14A and 14B illustrate operations of methods for implementing a guest OS using containers and for performing various development operations, according to certain embodiments of this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a processor or processing circuitry, for example, a mobile device.

The operations described with reference to the non-limiting example of FIGS. 14A and 14B can, in certain embodiments, be performed in addition to, or in lieu of certain operations of previously-described methods (for example, method 1300 in FIG. 13) according to this disclosure.

Referring to the non-limiting example of FIG. 14A, at operation 14A, an apparatus (for example, a device implementing architecture 500 in FIG. 5) executes a process written for a guest OS natively within a guest OS container (for example, guest OS container 510 in FIG. 5, or guest OS container 225 in FIG. 5). According to various embodiments, the process written for guest OS is mapped to the same dedicated domain in the OS as the guest OS container (for example, as shown with respect to GOS processes 360 in FIG. 3).

According to various embodiments, at operation 1410, the view of processes running within a guest OS container from the host OS is restricted by removing mount information of the container form a host OS mount table. Similarly, in certain embodiments according to this disclosure, the view of processes running in the host OS from a guest OS container can be restricted by removing the host OS mount information from the container mount table. In some embodiments, the restriction of visibility across a host OS/guest OS container partition can be achieved with one or more of the unshare, namespace restrict or pivot root system calls.

In some embodiments according to this disclosure, at operation 1415, the kernel of the host OS is modified to mask information regarding a host process from processes running in a guest OS container. As discussed in this disclosure, certain types of information regarding host OS processes (for example, UI inputs) which might otherwise visible to processes in the guest OS container can be maliciously leveraged to implement side-channel attacks. According to certain embodiments, such sensitive information regarding host processes may be masked by one or more of zeroing out values of sensitive information, adding random numbers or other noise to the sensitive information, or making such sensitive information invisible to processes in the guest OS container.

Examples of masking information of a host process from processes in a guest container include, without limitation, modifying the host OS kernel such that sensitive information (for example, certain information in a/proc, /dev or/sys file which can be used in a side-channel attack) is masked from a user space across the host OS-guest OS partition. In certain embodiments, the sensitive information is zeroed out. In some embodiments, noise (for example, random numbers) is added to the sensitive information, such that it becomes unrecognizable, and making the inferences used to support side-channel attacks becomes increasingly difficult, if not impossible.

According to various embodiments, at operation 1420, a management application (for example, host side SDK 540 in FIG. 5) is connected with a daemon (for example, a system daemon included as part of guest side SDK 545 in FIG. 5) to establish a secure command and control channel between a userspace of the host OS and a guest OS container (for example, guest OS container 510 in FIG. 5).

Referring to the non-limiting example of FIG. 14A, at operation 1425, in response to a resource availability event (for example, unplugging the device from an external power source), a guest control program on the host OS side (for example, guest control program 701 in FIG. 7), transmits a "pause" or "resume" command to a group of processes (for example, a Cgroup) associated with programs or processes running or executing in a guest OS container (for example, guest OS container 751). In this way, the technical challenges of implementing granular control over processes in a guest OS container's use of resources (for example, CPU, network or power resources) shared by a host OS and a guest OS container despite the host OS's limited visibility of the processes in the guest OS container are addressed.

Referring to the non-limiting example of FIG. 14B, at operation 1430, a process of a management application (for example, tool service 805 in FIG. 8) operating in a guest OS container (for example, dispatcher 820 in FIG. 8) encrypts messages to be sent over a secure command and control channel (for example, secure communication channel 825 in FIG. 8) with the private key of a private/public key set generated by the management application or a module thereof (for example, command center 815 in FIG. 8), and provides transmits the encrypted messages to a designated recipient (for example, daemon 850 in FIG. 8) running under the host OS.

According to various embodiments, at operation 1435, an activity plugin (for example, activity plugin 1251 in FIG. 12 controls the activity status of a target application (for example, target application 1215) running under the host OS of the device, to prevent one or more of: the target application freezing when a debugging application (which, in some embodiments, is running in a guest OS container, and in certain embodiments, is running under the host OS) is running as the foreground application; and the debugging application freezing when the target application is running as the foreground application.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for operating an electronic device, the method comprising:
spawning a name space tool (NST) as part of a boot process of a host OS, wherein the NST is a process with a plurality of root privileges of the host OS;
spawning, by the NST, a container for a guest OS, wherein the container for the guest OS is mapped to a dedicated domain in the host OS; and
dropping, by the NST, a root privilege of the host OS in response to spawning the container for the guest OS.

2. The method of claim 1, further comprising:
executing a process written for the guest OS natively within the container for the guest OS,
wherein the process is mapped to the dedicated domain in the host OS.

3. The method of claim 1, further comprising:
restricting a view of processes running in the container for the guest OS from the host OS.

4. The method of claim 3, wherein the view of processes running in the container for the guest OS is restricted using one or more of mount namespace, pivot_root, or unshare.

5. The method of claim 1, further comprising modifying a kernel to mask information regarding a host OS process to processes in the container for the guest OS.

6. The method of claim 1, further comprising:
connecting a management application running on the host OS with a daemon in the container for the guest OS to establish a secure command and control channel.

7. The method of claim 6, further comprising:
sending, from the management application running on the host OS to the daemon, at least one of a stop command, a start command, or a resume command;
detecting, by a host OS process, a resource availability event; and
responsive to detecting the resource availability event, sending by the management application, and instruction associated with a group of processes executing in the container for the guest OS,
wherein the instruction is at least one of a pause command or a resume command.

8. The method of claim 6, further comprising:
generating a private/public key pair for the secure command and control channel;
sending, by the management application, a public key of the private/public key pair and a set of initial set up commands to the daemon in the container for the guest OS; and
saving the public key, by the daemon in the container for the guest OS.

9. The method of claim 8, further comprising:
transmitting, by the management application, a command to the daemon in the container for the guest OS, wherein the command is wrapped with a private key of the private/public key pair.

10. The method of claim 1, further comprising:
running an instance of a target application in an environment of the host OS; and
running a debugging client associated with the target application in the container for the container for the guest OS,
wherein an activity plugin in a framework of the host OS controls an activity status of the target application to prevent the target application from freezing the debugging client.

11. An apparatus, comprising:
a processor; and
a memory comprising a host OS,
the memory contains instructions, which, when executed by the processor, cause the apparatus to:
spawn a name space tool (NST) as part of a boot process of the host OS, wherein the NST is a process with a plurality of root privileges of the host OS,
spawn, by the NST, a container for a guest OS, wherein the container for the guest OS is mapped to a dedicated domain in the host OS, and
spawn, by the NST, a root privilege of the host OS in response to spawning the container for the guest OS.

12. The apparatus of claim 11, wherein the memory further contains instructions, which, when executed by the processor, cause the apparatus to:
execute a process written for the guest OS natively within the container for the guest OS,
wherein the process is mapped to the dedicated domain in the host OS.

13. The apparatus of claim 11, wherein the memory further contains instructions, which, when executed by the processor, cause the apparatus to restrict a view of processes running in the container for the guest OS from the host OS.

14. The apparatus of claim 13, wherein the view of processes running in the container for the guest OS is restricted using one or more of mount namespace, pivot_root, or unshare.

15. The apparatus of claim 11, wherein the memory further contains instructions, which, when executed by the processor, cause the apparatus to modify a kernel to mask information regarding a host OS process to processes in the container for the guest OS.

16. The apparatus of claim 11, wherein the memory further contains instructions, which, when executed by the processor, cause the apparatus to connect a management application running on the host OS with a daemon in the container for the guest OS to establish a secure command and control channel.

17. The apparatus of claim 16, wherein the memory further contains instructions, which, when executed by the processor, cause the apparatus to:

send, from the management application running on the host OS to the daemon, at least one of a stop command, a start command, or a resume command, detect, by a host OS process, a resource availability event, and responsive to detecting the resource availability event, send by the management application, and instruction associated with a group of processes executing in the container for the guest OS, wherein the instruction is at least one of a pause command or a resume command.

18. The apparatus of claim 16, wherein the memory further contains instructions, which, when executed by the processor, cause the apparatus to:

generate a private/public key pair for the secure command and control channel, send, by the management application, a public key of the private/public key pair and a set of initial set up commands to the daemon in the container for the guest OS, and save the public key, by the daemon in the container for the guest OS.

19. The apparatus of claim 18, wherein the memory further contains instructions, which, when executed by the processor, cause the apparatus to:

transmitting, by the management application, a command to the daemon in the container for the guest OS, wherein the command is wrapped with a private key of the private/public key pair.

20. The apparatus of claim 11, wherein the memory further contains instructions, which, when executed by the processor, cause the apparatus to:

run an instance of a target application in an environment of the host OS, and run a debugging client associated with the target application in the container for the container for the guest OS, wherein an activity plugin in a framework of the host OS controls an activity status of the target application to prevent the target application from freezing the debugging client.

21. A non-transitory, computer readable medium, comprising program code, which, when executed by a processor, causes an apparatus to:

spawn a name space tool (NST) as part of a boot process of a host OS, wherein the NST is a process with a plurality of root privileges of the host OS, spawn, by the NST, a container for a guest OS, wherein the container for the guest OS is mapped to a dedicated domain in the host OS, and spawn, by the NST, a root privilege of the host OS in response to spawning the container for the guest OS.

22. The non-transitory, computer-readable medium of claim 21, further comprising instructions, which, when executed by the processor, cause the apparatus to:

execute a process written for the guest OS natively within the container for the guest OS, wherein the process is mapped to the dedicated domain in the host OS.

23. The non-transitory, computer-readable medium of claim 21, further comprising instructions, which, when executed by the processor, cause the apparatus to restrict a view of processes running in the container for the guest OS from the host OS.

24. The non-transitory, computer-readable medium of claim 23, wherein the view of processes running in the container for the guest OS is restricted using one or more of mount namespace, pivot_root, or unshare.

25. The non-transitory, computer-readable medium of claim 21, further comprising instructions, which, when executed by the processor, cause the apparatus to modify a kernel to mask information regarding a host OS process to processes in the container for the guest OS.

26. The non-transitory, computer-readable medium of claim 21, further comprising instructions, which, when executed by the processor, cause the apparatus to connect a management application running on the host OS with a daemon in the container for the guest OS to establish a secure command and control channel.

27. The non-transitory, computer-readable medium of claim 26, further comprising instructions, which, when executed by the processor, cause the apparatus to:

send, from the management application running on the host OS to the daemon, at least one of a stop command, a start command, or a resume command, detect, by a host OS process, a resource availability event, and responsive to detecting the resource availability event, send by the management application, and instruction associated with a group of processes executing in the container for the guest OS, wherein the instruction is at least one of a pause command or a resume command.

28. The non-transitory, computer-readable medium of claim 26, further comprising instructions, which, when executed by the processor, cause the apparatus to:

generate a private/public key pair for the secure command and control channel, send, by the management application, a public key of the private/public key pair and a set of initial set up commands to the daemon in the container for the guest OS, and save the public key, by the daemon in the container for the guest OS.

29. The non-transitory, computer-readable medium of claim 28, further comprising instructions, which, when executed by the processor, cause the apparatus to:

transmitting, by the management application, a command to the daemon in the container for the guest OS, wherein the command is wrapped with a private key of the private/public key pair.

30. The non-transitory, computer-readable medium of claim 21, further comprising instructions, which, when executed by the processor, cause the apparatus to:

run an instance of a target application in an environment of the host OS, and run a debugging client associated with the target application in the container for the container for the guest OS, wherein an activity plugin in a framework of the host OS controls an activity status of the target application to prevent the target application from freezing the debugging client.

* * * * *